United States Patent
Noh et al.

(10) Patent No.: US 10,959,121 B1
(45) Date of Patent: Mar. 23, 2021

(54) DYNAMIC TRANSMIT CHAIN AVAILABILITY SIGNALING IN WIRELESS DEVICES

(71) Applicant: NEWRACOM, INC., Irvine, CA (US)

(72) Inventors: Yujin Noh, Irvine, CA (US); Young Hoon Kwon, Irvine, CA (US)

(73) Assignee: NEWRACOM, INC., Lake Forest, CA (US)

( * ) Notice: Subject to any disclaimer, the term of this patent is extended or adjusted under 35 U.S.C. 154(b) by 0 days.

(21) Appl. No.: 15/844,388

(22) Filed: Dec. 15, 2017

Related U.S. Application Data

(60) Provisional application No. 62/437,001, filed on Dec. 20, 2016.

(51) Int. Cl.
| | |
|---|---|
| H04W 28/02 | (2009.01) |
| H04W 72/04 | (2009.01) |
| H04W 8/22 | (2009.01) |
| H04L 1/06 | (2006.01) |
| H04W 74/08 | (2009.01) |

(52) U.S. Cl.
CPC ....... *H04W 28/0215* (2013.01); *H04L 1/0643* (2013.01); *H04W 8/22* (2013.01); *H04W 72/042* (2013.01); *H04W 72/048* (2013.01); *H04W 72/0453* (2013.01); *H04W 74/0816* (2013.01)

(58) Field of Classification Search
CPC ......... H04W 28/0215; H04W 72/0453; H04W 72/042; H04W 8/22; H04W 72/048; H04W 74/0816; H04L 1/0643
See application file for complete search history.

(56) References Cited

U.S. PATENT DOCUMENTS

| | | | |
|---|---|---|---|
| 8,437,440 B1* | 5/2013 | Zhang | H04L 1/0625 375/366 |
| 2007/0140364 A1* | 6/2007 | Ouyang | H03M 13/2703 375/260 |
| 2010/0111220 A1* | 5/2010 | Rouquette-Leveil | H04L 1/0618 375/295 |
| 2012/0140842 A1* | 6/2012 | Vermani | H04B 7/0417 375/295 |
| 2012/0328034 A1* | 12/2012 | Nabar | H04B 7/0617 375/260 |
| 2013/0136075 A1* | 5/2013 | Yu | H04W 72/0453 370/329 |

(Continued)

OTHER PUBLICATIONS

Seok et al., Notification of Operating Mode Changes, Sep. 13, 2015, IEEE 802.11-15/1034r0 (Year: 2015).*

(Continued)

*Primary Examiner* — Tejis Daya

(57) ABSTRACT

A wireless devices communicates a transmission capability by determining a number of active transmits chains of the wireless device, determining a maximum number of space-time streams according to the number of active transmit chains, providing a frame with an indication of the maximum number of space-time streams, and transmitting the frame. The wireless devices may provide the indication of the maximum number of space-time streams in an Operating Mode field of High Efficiency Aggregate Control field of the frame. The maximum number of space-time streams may be a maximum number of space-time streams that may be used by the wireless device to respond to a Trigger frame.

17 Claims, 15 Drawing Sheets

(56) References Cited

U.S. PATENT DOCUMENTS

| | | | | |
|---|---|---|---|---|
| 2013/0308713 A1* | 11/2013 | Zhang | ............... | H04B 7/0634 375/267 |
| 2014/0185695 A1* | 7/2014 | Kenney | ............... | H04B 7/0413 375/260 |
| 2014/0269994 A1* | 9/2014 | HomChaudhuri | ............... | H04W 52/0209 375/316 |
| 2015/0071204 A1* | 3/2015 | Seok | ............... | H04B 7/0452 370/329 |
| 2015/0124690 A1* | 5/2015 | Merlin | ............... | H04W 52/02 370/312 |
| 2015/0288501 A1* | 10/2015 | Kwon | ............... | H04L 5/0007 370/329 |
| 2016/0036637 A1* | 2/2016 | Malik | ............... | H04L 41/0816 370/329 |
| 2016/0156497 A1* | 6/2016 | Yang | ............... | H04B 7/0452 370/328 |
| 2016/0366254 A1* | 12/2016 | Asterjadhi | ............... | H04L 69/324 |
| 2016/0381565 A1* | 12/2016 | Oteri | ............... | H04W 16/14 370/328 |
| 2017/0332385 A1* | 11/2017 | Shirali | ............... | H04W 28/0268 |
| 2018/0176789 A1* | 6/2018 | Fischer | ............... | H04W 16/14 |

OTHER PUBLICATIONS

"Part 11: Wireless LAN Medium Access Control (MAC) and Physical Layer (PHY) Specifications", IEEE Standards 802.11™-2012 (Revision of IEEE Standard 802.11-2007), Mar. 29, 2012, pp. 1-2695, IEEE (The Institute of Electrical and Electronic Engineers, Inc.), New York, NY, USA.

"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac™-2013, 2013, pp. 1-395, IEEE (The Institute of Electrical and Electronic Engineers, Inc.), New York, NY, USA.

"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (The Institute of Electrical and Electronic Engineers, Inc.), New York, NY, USA.

* cited by examiner

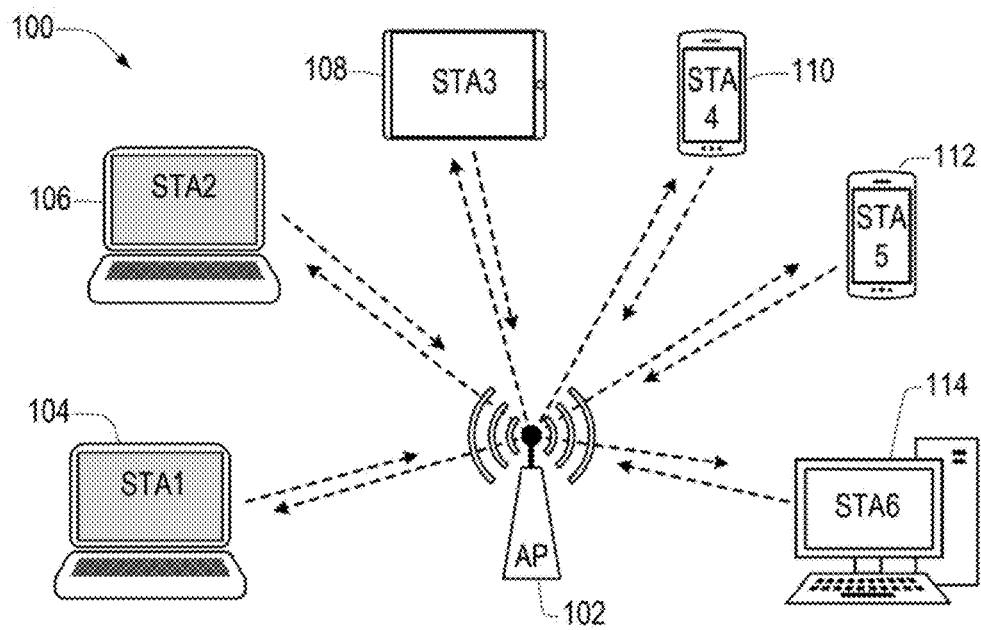
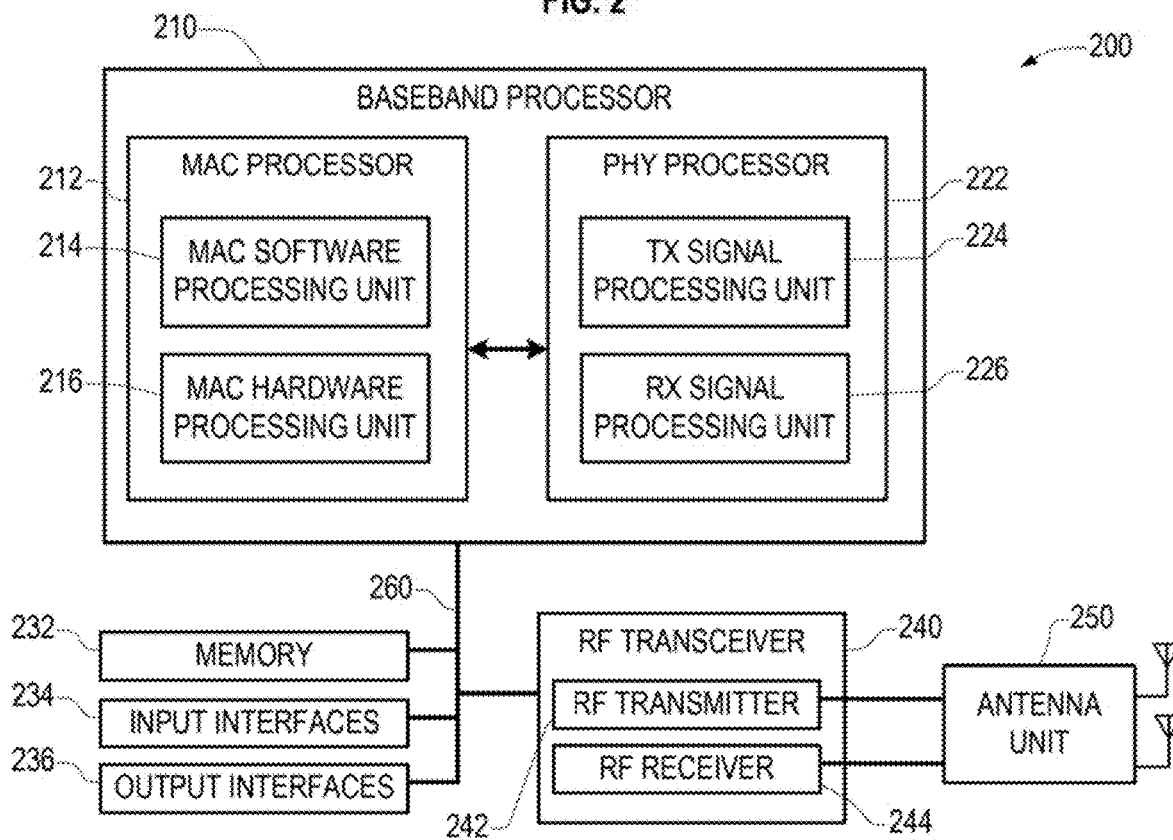

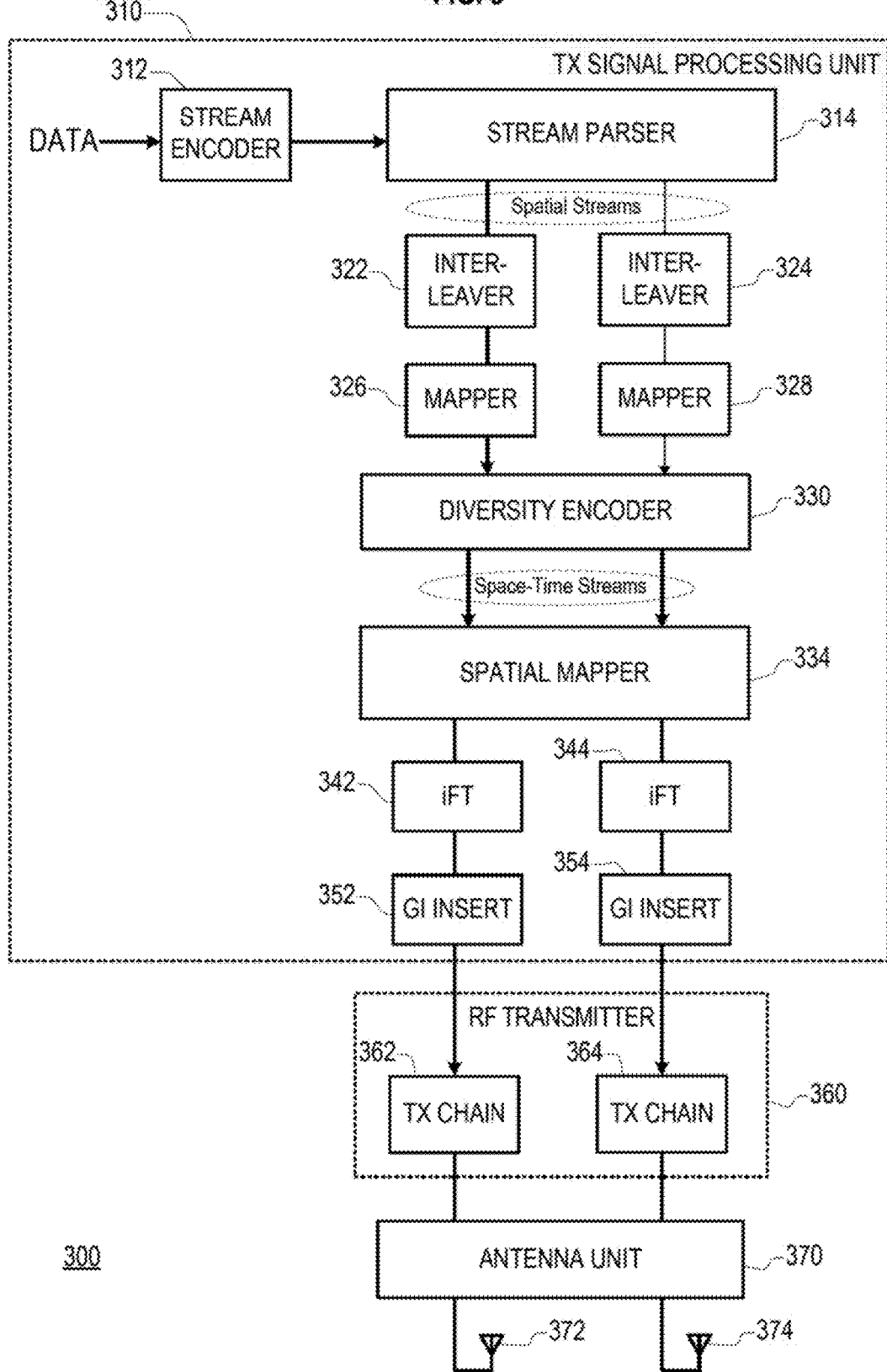

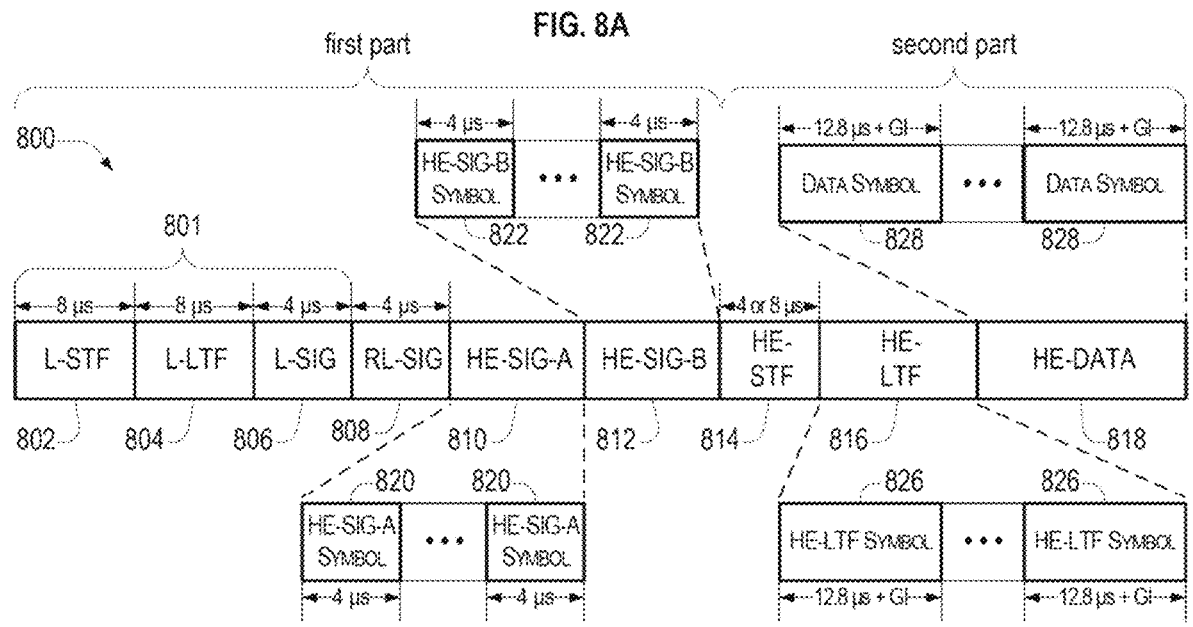

Table 1:

| Element | definition | duration | DFT period | GI | Subcarrier spacing |
|---|---|---|---|---|---|
| Legacy (L)-STF | Non-HT Short Training field | 8 μs | - | - | equiv. to 1,250 kHz |
| L-LTF | Non-HT Long Training field | 8 μs | 3.2 μs | 1.6 μs | 312.5 kHz |
| L-SIG | Non-HT Signal field | 4 μs | 3.2 μs | 0.8 μs | 312.5 kHz |
| RL-SIG | Repeated Non-HT SIGNAL field | 4 μs | 3.2 μs | 0.8 μs | 312.5 kHz |
| HE-SIG-A | HE SIGNAL A field | $N_{HESIGA}$ * 4 μs | 3.2 μs | 0.8 μs | 312.5 kHz |
| HE-SIG-B | HE SIGNAL B field | $N_{HESIGB}$ * 4 μs | 3.2 μs | 0.8 μs | 312.5 kHz |
| HE-STF | HE Short Training field | 4 or 8 μs | - | - | • non-trigger-based PPDU: (equiv. to) 1,250 kHz; • trigger-based PPDU: (equiv. to) 625 kHz |
| HE-LTF | HE Long Training field | $N_{HELTF}$ * (DFT period + GI) μs | 2xLTF: 6.4 μs 4xLTF: 12.8 μs | supports 0.8, 1.6, 3.2 μs | • 2xLTF: (equiv. to) 156.25 kHz; • 4xLTF: 78.125 kHz |
| HE-DATA | HE DATA field | $N_{DATA}$ * (DFT period + GI) μs | 12.8 μs | supports 0.8, 1.6, 3.2 μs | 78.125 kHz |

FIG. 9
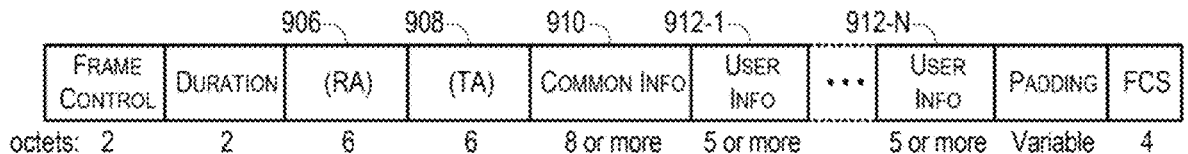
FIG. 10
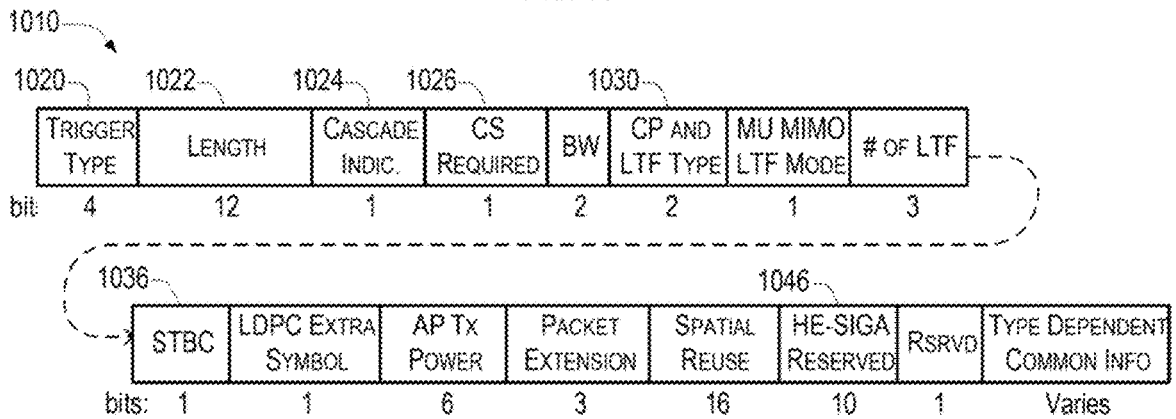
FIG. 11
Table 2
| Trigger Type Field Value | Description |
|---|---|
| 0 | Basic trigger |
| 1 | Beamforming Report Poll Trigger |
| 2 | MU-BAR |
| 3 | MU-RTS |
| 4-TBD | TBD/Reserved |
FIG. 12
Table 3
| CP and LTF Field Value | Description |
|---|---|
| 0 | 2x LTF + 0.8 μs CP |
| 1 | 2x LTF + 1.2 μs CP |
| 2 | 4x LTF + 3.2 μs CP |
| 3 | TBD/Reserved |

FIG. 13

Table 4

| Symbol | Explanation |
|---|---|
| $N_{CBPS}$, $N_{CBPS,u}$ | Number of coded bits per symbol for user $u$, $u = 0, ..., N_{user,total} - 1$. For an HE SU PPDU, $N_{CBPS} = N_{CBPS,0}$. For an HE MU PPDU, $N_{CBPS}$ is undefined |
| $N_{CBPSS}$, $N_{CBPSS,u}$ | Number of coded bits per symbol per spatial stream. For the Data field, $N_{CBPSS,u}$ equals the number of coded bits per symbol per spatial stream for user $u$, $u = 0, ..., N_{user,total} - 1$. For the Data field of an HE SU PPDU, $N_{CBPSS} = N_{CBPSS,0}$ For the Data field of an HE MU PPDU, $N_{CBPSS}$ is undefined |
| $N_{DBPS}$, $N_{DBPS,u}$ | Number of data bits per symbol for user $u$, $u = 0, ..., N_{user,total} - 1$. For an HE SU PPDU, $N_{DBPS} = N_{DBPS,0}$. For an HE MU PPDU, $N_{DBPS}$ is undefined |
| $N_{BPSCS}$, $N_{BPSCS,u}$ | Number of coded bits per subcarrier per spatial stream for user $u$, $u = 0, ..., N_{user,total} - 1$. For an HE SU PPDU, $N_{BPSCS} = N_{BPSCS,0}$. For an HE MU PPDU, $N_{BPSCS}$ is undefined |
| $N_{RX}$ | Number of receive chains |
| $N_{RU}$ | For pre-HE modulated fields, $N_{RU} = 1$. For HE modulated fields, $N_{RU}$ represents the number of RUs in the transmission (equal to the TXVECTOR parameter NUM_RUS). |
| $N_{user,r}$ | For pre-HE modulated fields, $N_{user,r} = 1$. For HE modulated fields, $N_{user,r}$ represents the total number of users in the $r$-th RU of the transmission (summing over all RUs equals to the TXVECTOR parameter NUM_USERS_TOTAL). |
| $N_{STS}$, $N_{STS,r,u}$ | For pre-HE modulated fields, $N_{STS,r,u} = 1$ (see NOTE). For HE modulated fields, $N_{STS,r,u}$ represents the number of space-time streams at $r$-th RU for user $u$, $u = 0, ..., N_{user,r} - 1$. In case of STBC, $N_{STS,r,u} = 2$. For an HE SU PPDU, $N_{STS} = N_{STS,0,0}$. For an HE MU PPDU, $N_{STS} = max_{r=0}^{N_{RU}-1} N_{STS,r,total}$ |
| $N_{STS,r,total}$ | For HE modulated fields, $N_{STS,r,total}$ is total number of space-time streams at the $r$-th RU in PPDU: $N_{STS,r,total} = \sum_{u=0}^{N_{user,r}-1} N_{STS,r,u}$ For pre-HE modulated fields, $N_{STS,r,total}$ is undefined when the TXVECTOR parameter BEAM_CHANGE is 1 and $N_{STS,r,total} = N_{STS}$ when BEAM_CHANGE is 0. Note that $N_{STS,r,total} = N_{STS}$ for an HE SU PPDU. |
| $N_{SS}$, $N_{SS,r,u}$, $N_{SS,u}$ | Number of spatial streams. For the Data field, $N_{SS,r,u}$ is the number of spatial streams at $r$-th RU for user $u$, $u = 0, ..., N_{user,r} - 1$ and $N_{SS,u}$ is number of spatial streams for user $u$, $u = 0, ..., N_{user,total} - 1$. For the Data field of an HE SU PPDU, $N_{SS} = N_{SS,0,0}$ For the Data field of an HE MU PPDU, $N_{SS} = max_{r=0}^{N_{RU}-1} N_{SS,r,total}$ |
| $N_{SS,r,total}$ | For HE modulated fields, $N_{SS,r,total}$ is the total number of spatial streams at $r$-th RU in a PPDU: $N_{SS,r,total} = \sum_{u=0}^{N_{user,r}-1} N_{SS,r,u}$ For pre-HE modulated fields, $N_{SS,r,total}$ is undefined. Note that $N_{SS,r,total} = N_{SS}$ for an HE SU PPDU. |
| $N_{TX}$ | Number of transmit chains |
| $N_{HE-LTF}$ | The number of OFDM symbols in the HE-LTF field |
| $N_{HE-SIG-B}$ | The number of OFDM symbols in the HE-SIG-B field |
| $K_r$ | Set of subcarrier indices in the $r$-th RU |
| $R$, $R_u$ | $R_u$ is the coding rate for user $u$, $u = 0, ..., N_{user,total} - 1$. For an HE SU PPDU, $R = R_0$. For an HE MU PPDU, $R$ is undefined |
| $M_{r,u}$ | For pre-HE modulated fields, $M_{r,u} = 0$. For HE modulated fields, $M_{r,0} = 0$ for $u = 0$ and $M_{r,u} = \sum_{u'=0}^{u-1} N_{STS,r,u'}$ for $u, u = 1, ..., N_{user,r} - 1$. |
| NOTE—For pre-HE modulated fields, $u$ and $r$ are zeros only since $N_{user,r} = 1$ and $N_{RU} = 1$. | |

FIG. 14

Table 5

Highest data subcarrier index $N_{SR}$ for pre-HE modulated fields

| Field | $N_{SR}$ as a function of bandwidth | | | |
|---|---|---|---|---|
| | 20 MHz | 40 MHz | 80 MHz | 160 MHz |
| L-STF | 26 | 58 | 122 | 250 |
| L-LTF | 26 | 58 | 122 | 250 |
| L-SIG | 28 | 60 | 124 | 252 |
| RL-SIG | 28 | 60 | 124 | 252 |
| HE-SIG-A | 28 | 60 | 124 | 252 |
| HE-SIG-B | 28 | 60 | 124 | 252 |

FIG. 15

Table 6

Tone scaling factor and guard interval duration values for HE PPDU fields

| Field | $N_{Field}^{Tone}$ as a function of bandwidth, and RU size per frequency segment | | | | Guard interval duration |
|---|---|---|---|---|---|
| | 20 MHz | 40 MHz | 80 MHz | 160 MHz | |
| L-STF | 12 | 24 | 48 | 96 | - |
| L-LTF | 52 | 104 | 208 | 416 | $T_{GI,L-LTF}$ |
| L-SIG in an HE PPDU | 56 | 112 | 224 | 448 | $T_{GI,LegacyPreamble}$ |
| L-SIG in a non-HT duplicate PPDU | - | 104 | 208 | 416 | $T_{GI,LegacyPreamble}$ |
| RL-SIG | 56 | 112 | 224 | 448 | $T_{GI,LegacyPreamble}$ |
| HE-SIG-A | 56 | 112 | 224 | 448 | $T_{GI,LegacyPreamble}$ |
| HE-SIG-B | 56 | 112 | 224 | 448 | $T_{GI,LegacyPreamble}$ |
| HE-STF not in an HE trigger-based PPDU | 14 | 30 | 62 | 124 | - |
| HE-STF in an HE trigger-based PPDU | 30 | 60 | 124 | 248 | - |
| HE-LTF 1x Duration | 60 | 122 | 250 | 500 | $T_{GI,HE-LTF1}$ |
| HE-LTF 2x Duration | 122 | 242 | 498 | 996 | $T_{GI,HE-LTF2}$ |
| HE-LTF 4x Duration | 242 | 484 | 996 | 1992 | $T_{GI,HE-LTF4}$ |
| HE-Data | 242 | 484 | 996 | 1992 | $T_{GI,Data}$ |
| NON_HT_DUP_OFDM-Data | - | 104 | 208 | 416 | $T_{GI,LegacyPreamble}$ |
| NOTE—in the case of an HE OFDMA PPDU, the $N_{Field}^{Tone}$ value of HE-STF, HE-LTF and HE-Data fields is variable, and is determined by which RUs of the current full bandwidth are transmitted in the PPDU. | | | | | |

FIG. 16

Table 7

CH_BANDWIDTH and $Y_{k,BW}$ for pre-HE modulated fields

| CH_BANDWIDTH | $Y_{k,BW}$ |
|---|---|
| CBW20 | $Y_{k,20}$ |
| CBW40 | $Y_{k,80}$ |
| CBW80 | $Y_{k,80}$ |
| CBW160 | $Y_{k,160}$ |
| CBW80+80 | $Y_{k,80}$ per frequency segment |

FIG. 17

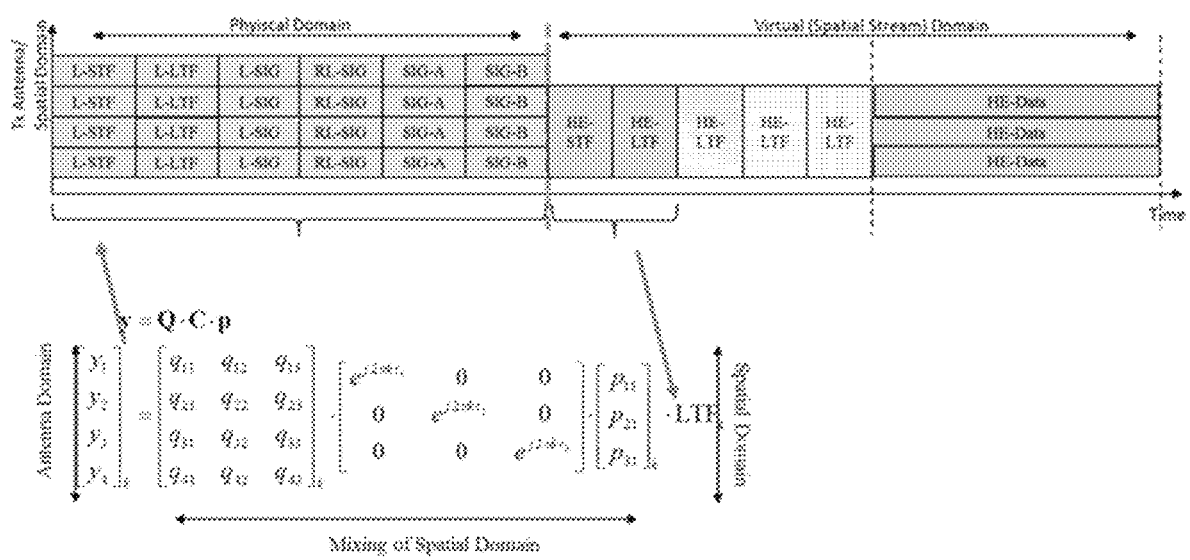

FIG. 18

Table 8

| Variant | Bit 0 (value) | Bit 1 (value) | Bit 2-29 | Bit 30 | Bit 31 |
|---|---|---|---|---|---|
| HT Variant | VHT (0) | | HT Control Middle | AC Constraint | RDG/More PPDU |
| VHT Variant | VHT (1) | HE (0) | VHT Control Middle | AC Constraint | RDG/More PPDU |
| HE Variant | VHT (1) | HE (1) | Aggregated Control (HE A-Control) | | |

FIG. 19A

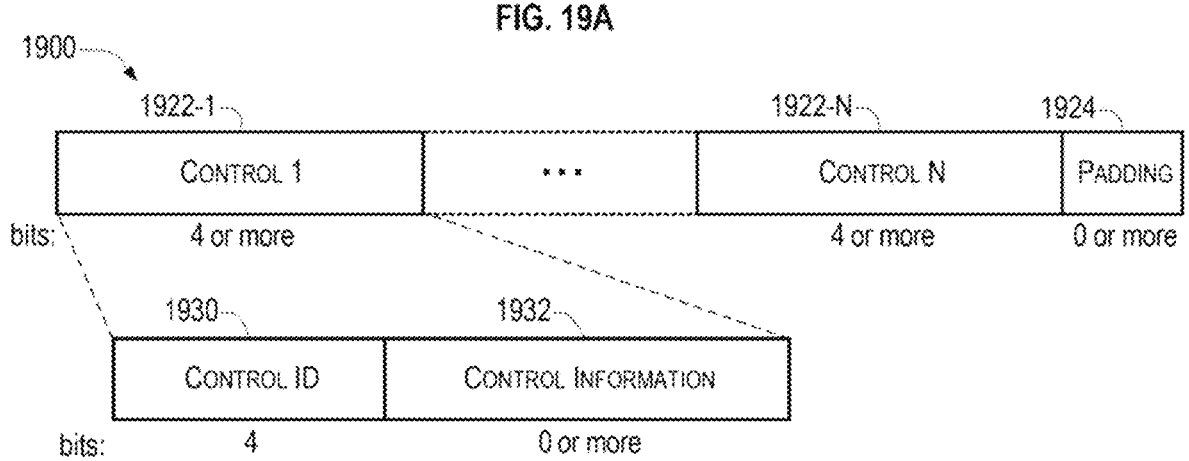

FIG. 19B

Table 9

| Control ID | Meaning | Control Information length (bits) | Content of Control Information Subfield |
|---|---|---|---|
| 0 | UL MU Response Scheduling | 26 | See 9.2.4.6.4.2 (UL MU Repsonse Scheduling) |
| 1 | Operating Mode | 12 | See FIG. 20 |
| 2 | HE Link Adaptation | 16 | See 9.2.4.6.4.4 (HE Link Adaptation) |
| 3 | Buffer Status Report (BFR) | 26 | See 9.2.4.6.4.5 (Buffer Status Report) |
| 4 | UL Power Headroom | 8 | See 9.2.4.6.4.6 (UL Power Headroom) |
| 5 | Bandwidth Query Report (BQR) | 10 | See 9.2.4.6.4.7 (Bandwidth Query Report) |
| 6 | Reverse Direction Protocol | 8 | |
| 7-15 | Reserved | | |

FIG. 20

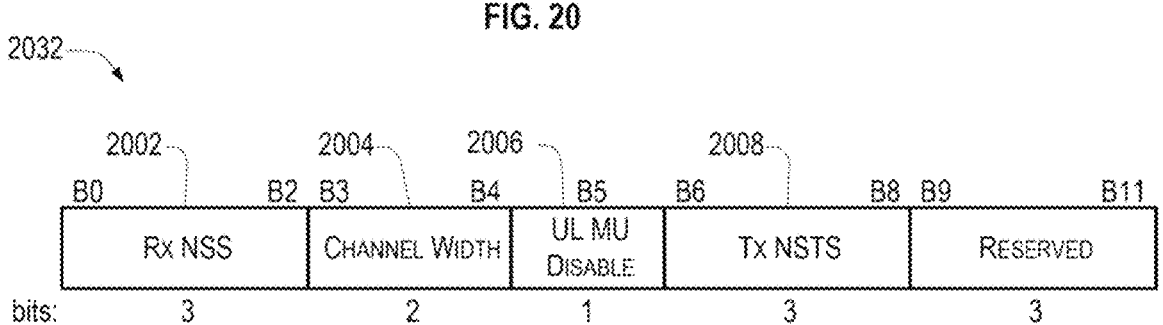

DYNAMIC TRANSMIT CHAIN AVAILABILITY SIGNALING IN WIRELESS DEVICES

CROSS-REFERENCE TO RELATED APPLICATION

This application claims priority to and the benefit of U.S. Provisional Application 62/437,001, filed on Dec. 20, 2016, the entire contents of which are incorporated herein by reference.

BACKGROUND

The technology described herein relates generally to wireless networking. More particularly, the technology relates generally to the communication by a wireless device of a currently available capability for performing transmissions.

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012) (hereinafter, IEEE 802.11). The IEEE Std 802.11™-2012 was subsequently amended by IEEE Std 802.11ae™-2012, IEEE Std 802.11aa™-2012, IEEE Std 802.11ad™-2012, and IEEE Std 802.11ac™-2013 (hereinafter, IEEE 802.11ac). These standards are each hereby incorporated by reference herein in their entirety.

The standards committee continues to work on new standards to improve upon the previously adopted standards. For example, the standards committee is currently working on IEEE 802.11ax that will define a high efficiency WLAN for enhancing the system throughput in high-density environments.

SUMMARY

Embodiments relate to communicating a transmission capability of a wireless device, such as a number of space-time streams the wireless device is currently and dynamically configured to use in an up-link (UL) communication.

In an embodiment, a method for communicating a transmission capability of a wireless device comprises determining, by the wireless device, a number of active transmits chains of the wireless device; determining, by the wireless device, a maximum number of space-time streams according to the number of active transmit chains; providing, by the wireless device in a frame, an indication of the maximum number of space-time streams; and transmitting the frame.

In an embodiment, a wireless device comprises a plurality of transmit chains and a processor operable to control the plurality of transmit chains. The wireless device is to determine a number of active transmits chains of the plurality of transmit chains, determine a maximum number of space-time streams according to the number of active transmit chains, provide an indication of the maximum number of space-time streams in a frame; and transmit the frame using at least one of the plurality of transmit chains.

BRIEF DESCRIPTION OF THE DRAWINGS

FIG. 1 illustrates a wireless network according to an embodiment.

FIG. 2 illustrates a design of a wireless device according to an embodiment.

FIG. 3 illustrates components of a wireless device configured to transmit data according to an embodiment.

FIG. 8A illustrates a High Efficiency (HE) Physical layer Protocol Data Unit (PPDU), according to an embodiment.

FIG. 8B shows a Table 1 disclosing additional properties of fields of the HE PPDU frame of FIG. 8A, according to an embodiment.

FIG. 9 illustrates a Trigger frame according to an embodiment.

FIG. 10 illustrates a Common Info field of a Trigger frame according to an embodiment.

FIG. 11 shows a Table 2 of Trigger Type subfield encoding values that define the valid Trigger Type according to an embodiment.

FIG. 12 shows a Table 3 of Cyclic Prefix (CP) and Long Training Field (LTF) subfield encoding values that define the valid Trigger Type according to an embodiment.

FIG. 13 shows a Table 4 of frequently used parameters in the equations herein.

FIG. 14 shows a Table 5 of numbers of subcarriers $N_{SR}$ values according to the bandwidth of a transmission for fields in the transmission, according to an embodiment.

FIG. 15 shows a Table 6 of a number of tones per field $N_{Field}^{Tone}$ by bandwidth and field according to an embodiment.

FIG. 16 shows a Table 7 of bandwidth and $Y_{k,BW}$ as determined by the TXVECTOR parameter CH_BANDWIDTH according to an embodiment.

FIG. 17 describes a transmit chain of an HE-LTF field according to an embodiment.

FIG. 18 shows a Table 8 illustrating formats of a High Throughput (HT) Control field according to an embodiment.

FIG. 19A illustrates the format of the HE Aggregated Control (A-Control) subfield of the HE variant HT Control field, according to an embodiment.

FIG. 19B shows a Table 9 of Control ID subfield values for a Control field of an HE A-Control subfield and length of respective Control Information, according to an embodiment.

FIG. 20 illustrates Control Information for a HE A-Control subfield having a Control ID corresponding to Operating Mode according to an embodiment.

DETAILED DESCRIPTION

Figure 4:
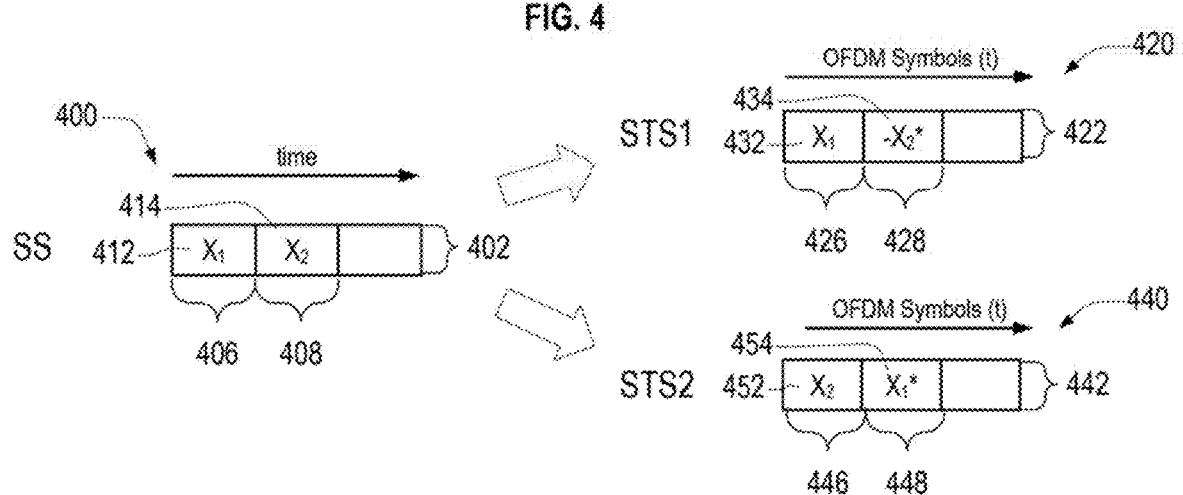
FIG. 4 illustrates Space-Time Block Encoding (STBC) according to an embodiment.

The invention relates generally to wireless networking, e.g., the technology relating generally to selective utilization of transmit chains in a wireless device in a Wireless Local Area Network (WLAN).

In the following detailed description, certain illustrative embodiments have been illustrated and described. As those skilled in the art would realize, the described embodiments may be modified in various different ways without departing from the spirit or scope of the present disclosure. Accordingly, the drawings and description are to be regarded as illustrative in nature and not restrictive. Like reference numerals designate like elements in the specification.

A transmitted signal of a WLAN may travel through an environment that produces scattering, reflection, refraction, and other types of distortion. The transmitted signal may also be distorted by interferences or thermal noise in the receiver. A variety of techniques may be employed in the WLAN to reduce the impact of signal distortions.

A WLAN may incorporate Space Time Block Coding (STBC). STBC improve data transfer reliability in wireless systems by transmitting a data stream and variations of the data stream across a number of antennas. The environment of the WLAN distorts both the transmitted data stream and the transmitted variations of the data steam. Typically, the distortion of the transmitted data stream is different from the distortions of the transmitted variations of the data steam.

A receiver receives the distorted data stream and the distorted variations of the data stream. STBC combines the distorted data stream and the distorted variations of the data stream in order to extract as much information from each of them as possible.

STBC may be used to expand the spatial streams into twice as many space-time streams, that is, 1, 2, 3, and 4 spatial streams may be expanded into 2, 4, 6, and 8 space-time streams, respectively. As a result, when STBC is used, transmitting a single spatial stream requires two space-time streams, which in turn requires two transmit chains and two antennas.

Each spatial stream is expanded separately as follows: for first and second symbols $x_1$ and $x_2$ (in a time domain), a first spatial stream transmits the symbols $x_1$ and $x_2$ in their original order, and a second spatial stream transmits symbols $-x_2^*$ and $x_1^*$ having values corresponding to a negative complex conjugate of $x_2$ and a complex conjugate of $x_1$, respectively.

Thus, as shown in FIG. 4, discussed in more details below, the symbols $x_1$ and $x_2$ are transmitted using first and second transmitter outputs $y_1$ and $y_2$ at first and second times, respectively, as may be expressed as:

$$y_1 = \begin{bmatrix} x_1 \\ x_2 \end{bmatrix}, y_2 = \begin{bmatrix} -x_2^* \\ x_1^* \end{bmatrix} \qquad \text{Eq. 1}$$

wherein for each transmitter output at each time, a top element is a symbol transmitted using a first antenna, and a bottom element is a symbol transmitted using a second antenna. The first symbol $x_1$ is transmitted at a different time than the complex conjugate of the first symbol $x_1^*$, and the second symbol $x_2$ is transmitted at a different time than the negative complex conjugate of the second symbol $-x_2^*$.

First and second received symbols $r_1$ and $r_2$ at a IEEE 802.11ac compliant receiver having one antenna may be expressed by Equation 2:

$$r_1 = [h_{11} h_{21}] \begin{bmatrix} x_1 \\ x_2 \end{bmatrix} + n_1, r_2 = [h_{11} h_{21}] \begin{bmatrix} -x_2^* \\ x_1^* \end{bmatrix} + n_2. \qquad \text{Eq.2}$$

wherein $h_{ab}$ is a path gain for a path including an $a^{th}$ transmitting antenna and a $b^{th}$ receiving antenna, and $n_1$ and $n_2$ represent first and second additive white noise, respectively. The receiver can recover the transmitted symbols $x_1$ and $x_2$ using linear processing.

WLAN devices are currently being deployed in diverse environments. These environments are characterized by the existence of many access points and non-AP stations in geographically limited areas. Increased interference from neighboring devices gives rise to performance degradation.

Furthermore, the WLAN devices are increasingly required to support a variety of applications such as video, cloud access, and cellular network offloading. In particular, video traffic is expected to be the dominant type of traffic in many high efficiency WLAN deployments. With the real-time requirements of some of these applications, WLAN users demand improved performance in delivering their applications, including improved power consumption for battery-powered devices.

Currently, an amendment to the IEEE Std 802.11™ (hereinafter, the IEEE 802.11ax amendment) is being developed by the IEEE 802.11ax task group. The amendment will define a high efficiency WLAN for enhancing the system throughput in high-density scenarios and will improve power consumption for battery-powered devices.

Unlike previous amendments that focused on improving aggregate throughput, the IEEE 802.11ax amendment is focused on improving metrics that reflect user experience, such as average per station throughput, the 5th percentile of per station throughput of a group of stations, and area throughput. Improvements will target environments such as wireless corporate offices, outdoor hotspots, dense residential apartments, and stadiums.

The focus of the IEEE 802.11ax amendment is on indoor and outdoor operation of the WLAN in the 2.4 GHz and the 5 GHz frequency bands. Additional bands between 1 GHz and 6 GHz may be added as they become available. The WLAN according to the amendment may include a capability to handle multiple simultaneous communications in both spatial and frequency domains, in both uplink (UL) and downlink (DL) directions.

Active circuits may consume power even when idle. Accordingly, a device in a WLAN may dynamically adapt the number of active transmit chains, antenna chains, and channel width used for transmitting in order to reduce power consumption. The device may therefore communicate the current operating mode of the device including information related to the number of active transmit chains, to other devices. The number of active transmit chains may determine whether the device is currently able to perform Space-Time Block Coded (STBC) transmissions.

FIG. 1 illustrates a wireless network according to an embodiment. The wireless network includes an infrastructure Basic Service Set (BSS) 100 of a Wireless Local Area Network (WLAN). In an 802.11 wireless LAN, the BSS provides the basic building-block and typically includes an access point (AP) and one or more associated stations (STAs). In FIG. 1, the BSS 100 includes an Access Point 102 wirelessly communicating with a plurality of wireless devices (or stations) 104 to 114 (also referred to as AP and STA1 to STA6). The WLAN device may include a medium access control layer (MAC) and a physical layer (PHY) according to an IEEE (Institute of Electrical and Electronics Engineers) standard 802.11.

The AP 102 is a station, that is, a STA, configured to control and coordinate functions of the BSS 100. The AP 102 may transmit information to a single station selected from the plurality of stations STA1 to STA6 in the BSS 100 using a single frame, or simultaneously transmit information to two or more (e.g., to all six) stations STA1 to STA6 in the BSS 100 using either a single Orthogonal Frequency Division Multiplexing (OFDM) broadcast frame, a single OFDM Multi-User Multi-Input-Multi-Output (MU-MIMO) transmission, or a single Orthogonal Frequency Division Multiple Access (OFDMA) frame.

The stations STA1 to STA6 may transmit data to the Access Point using a single frame, or transmit information to and receive information from another one of the stations STA1 to STA6 using a single frame.

Each of the stations STA1 to STA6 and the Access Point AP includes a processor and a transceiver, and may further include a user interface and a display device. The processor is configured to generate a frame to be transmitted through a wireless network, to process a frame received through the wireless network, and to execute protocols of the WLAN. The processor may perform some or all of its functions by executing computer programming instructions stored on a non-transitory computer-readable medium. The transceiver represents a unit functionally connected to the processor, and designed to transmit and receive a frame through the wireless network. The transceiver may be defined using a single component that performs the functions of transmitting and receiving, or two separate components each performing one of such functions.

An access point may include a WLAN router, a stand-alone Access Point, a WLAN bridge, a Light-Weight Access Point (LWAP) managed by a WLAN controller, and the like. In addition, a station such as a personal computer or cellular phone may be able to operate as an access point, such as when a cellular phone is configured to operate as a wireless "hot spot."

A station may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but is not limited thereto.

In IEEE 802.11 standards, frames exchanged between stations (including access points) are classified into management frames, control frames, and data frames. The management frame may be a frame used for exchanging management information that are not forwarded to higher layer of a communication protocol stack. The control frame may be a frame used for controlling access to a medium. The data frame may be a frame used for transmitting data to be forwarded to higher layer of the communication protocol stack.

Each frame's type and subtype may be identified using a type field and a subtype field included in a control field of the frame, as prescribed in the applicable standard.

FIG. 2 illustrates a schematic block diagram of a wireless device 200 according to an embodiment. The wireless device 200 may be included in embodiments of one or more of the AP 102 and the stations 104 to 114 of the BSS 100 of FIG. 1.

The wireless or WLAN device 200 includes a baseband processor 210, a radio frequency (RF) transceiver 240, an antenna unit 250, a storage device (e.g., memory) 232, an input interface unit 234, and an output interface unit 236. The baseband processor 210, the memory 232, the input interface unit 234, the output interface unit 236, and the RF transceiver 240 may communicate with each other via a bus 260.

The baseband processor 210 performs baseband signal processing, and includes a MAC processor 212 and a PHY processor 222.

In an embodiment, the MAC processor 212 includes a MAC software processing unit 214 and a MAC hardware processing unit 216. The storage device (or memory) 232 may be a non-transitory computer readable media that stores software (i.e., computer programing instructions) hereinafter referred to as "MAC software." The MAC software processing unit 214 executes the MAC software to implement a first plurality of functions of the MAC layer. The MAC hardware processing unit 216 may implement a second plurality of functions of the MAC layer in special-purpose hardware, hereinafter referred to "MAC hardware." However, the MAC processor 212 is not limited thereto. For example, the MAC processor 212 may be configured to perform the first and second plurality of functions entirely in software or entirely in hardware according to implementation.

The PHY processor 222 includes a transmitting signal processing unit 224 and a receiving signal processing unit 226. The PHY processor 222 implement a plurality of functions of the PHY layer. These functions may be performed in software, hardware, or a combination thereof according to implementation. In an embodiment, the PHY processor 222 may be configured to generate channel state information (CSI) according to information received from the RF transceiver 240.

The CSI may include one or more of a Received Signal Strength Indication (RSSI), a Signal to Interference and Noise Ratio (SINR), a Modulation and Coding Scheme (MCS), and a Number of Spatial Streams (NSS). CSI may be generated for one or more of a frequency block, a sub-band within the frequency block, a subcarrier within a frequency block, a receiving antenna, a transmitting antenna, and combinations of a plurality thereof.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas.

The input interface unit 234 receives information from a user, and the output interface unit 236 outputs information to the user. The input interface unit 234 may include one or more of a keyboard, keypad, mouse, touchscreen, touch screen, microphone, and the like. The output interface unit 236 may include one or more of a display device, touch screen, speaker, and the like.

Many functions of the WLAN device 200 may be implemented in either hardware or software, and that which functions are implemented in software and which functions are implemented in hardware will vary according to constraints imposed on a design, which constraints may include one or more of design cost, manufacturing cost, time to market, power consumption, available semiconductor technology, and so on.

A wide variety of electronic devices, circuits, firmware, software, and combinations thereof known in the art may be used to implement the functions of the components of the WLAN device 200, and that the WLAN device 200 may include other widely-known components such as application processors, storage interfaces, clock generator circuits, power supply circuits, and the like, which have been omitted in the interest of brevity.

FIG. 3 illustrates components of a wireless device 300 configured to transmit data according to an embodiment, including a Transmission (Tx) Signal Processing Unit (TxSP) 310, and RF transmitter 360, an antenna unit 370, and first and second antennas 372 and 374. The TxSP 310, RF transmitter 360, and antenna unit 370 may be components of the transmitting signal processing unit 224, RF transmitter 242, and antenna unit 250 of the WLAN device 200 of FIG. 2 according to an embodiment.

The TxSP 310 includes a stream encoder 312, a stream parser 314, first and second interleavers 322 and 324, first and second mappers 326 and 328, a diversity encoder 330, a spatial mapper 334, first and second inverse Fourier Transformers (iFTs) 342 and 344, and first and second Guard Interval (GI) inserters 352 and 354.

The stream encoder 312 receives and encodes data. In an embodiment, the stream encoder 312 may include a Forward Error Correction (FEC) encoder. The FEC encoder may include a Binary Convolutional Code (BCC) encoder followed by a puncturing device, a Low-Density Parity-Check (LDPC) encoder, or one or more combinations thereof. A variety of circuits, software, algorithms, and combinations thereof are suitable for embodying the stream encoder 312.

In an embodiment, the TxSP 310 may further include a scrambler (not shown) for scrambling the input data before the encoding to reduce the probability of long sequences of 0s or 1s within the data. The TxSP 310 may further include an encoder parser (not shown) for demultiplexing the scrambled bits from the scrambler among a plurality of BCC encoders included in the FEC encoder when BCC encoding is used. The TxSP 310 may not use the encoder parser when LDPC encoding is used.

The stream parser 314 is configured to divide outputs of the encoder into one or more spatial streams. The stream parser 314 is shown dividing the outputs of the encoder into first and second spatial streams, that is, the Number of Spatial Streams ($N_{SS}$) is 2, but embodiments are not limited thereto, and in embodiments $N_{SS}$ may be 1, 3, 4, or more. In particular, wireless device 300 may dynamically control the number of spatial streams generated by the stream parser 314, such as when one or more transmit chains within the wireless device 300 are deactivated to save power.

The respective bits of the first and second spatial streams are interleaved by first and second interleavers 322 and 324 when BCC encoding is used. On the other hand, the first and second spatial streams may bypass the first and second interleavers 322 and 324, or may be passed through the first and second interleavers 322 and 324, respectively, when BCC encoding is not used.

The first and second mappers 326 and 328 map the sequence of bits of the first and second spatial stream to first and second sequences of constellation points, respectively. A constellation point may include a complex number representing an amplitude and a phase.

Within each of the first and second sequences of constellation points, the constellation points are divided into groups. Each group of constellation points corresponds to an OFDM symbol to be transmitted, and each constellation points in a group corresponds to a different subcarrier in the corresponding OFDM symbol.

The first and second mappers 326 and 328 may also perform LDPC tone mapping when LDPC encoding is used.

A wide variety of electronic devices, circuits, firmware, software, and combinations thereof known in the art may be used to implement the functions of the stream parser 314, the interleavers 322 and 324, and the mappers 326 and 328.

The diversity encoder 330 is configured to spread the constellation points from the spatial streams into a plurality of space-time streams in order to provide diversity gain, to implement Space-Time Block Coding (STBC), or both. Otherwise, one space-time stream may be output for each active spatial stream. In FIG. 3, the diversity encoder 330 is shown outputting two space-time streams, that is, a Number of Space-Time Streams ($N_{STS}$) is equal to 2, but embodiment are not limited thereto. Each space-time-stream corresponds to a different transmitting antenna or a different beam of a beamformed antenna array.

In an embodiment, $N_{STS}$ is twice $N_{SS}$ when STBC is used and $N_{STS}$ is equal to $N_{SS}$ when STBC is not used. For example, in an embodiment, when only one spatial stream is active in the TxSP 310, then the number of space-time streams output by the diversity encoder 330 may be one when the spatial stream is not encoded using STBC, and may be two when the spatial stream is encoded using STBC.

The diversity encoder 330 spreads each input constellation point output by the mappers 326 and 328 onto first and second output constellation points. The first output constellation points is included in a first space-time stream and the second output constellation point is included in a second space time stream different from the first space time stream.

In an embodiment, the first output constellation point has a value corresponding to a value of the input constellation point, and the second output constellation point has a value corresponding to a complex conjugate of the value of the input constellation point or to a negative of the complex conjugate (i.e., a negative complex conjugate).

The first output constellation point is at a different time slot (that is, in a different OFDM symbol period) than the second output constellation point when space-time block coding (STBC) is used, as shown in FIG. 4.

The spatial mapper 334 maps the space-time streams to one or more transmit chains. The spatial mapper maps the space-time stream to the transmit chains using a one-to-one correspondence when direct mapping is used. The spatial mapper maps each constellation point in each space-time stream to a plurality of transmit chains when spatial expansion or beamforming is used. Mapping the space-time streams to the transmit chains may include multiplying constellation points of the space time streams associated with an OFDM subcarrier by a spatial mapping matrix associated with the OFDM subcarrier.

The first and second iFTs 342 and 344 convert blocks of constellation points output by the spatial mapper 334 to a time domain block (i.e., a symbol) by applying an inverse discrete Fourier transform (iDFT) or an inverse fast Fourier transform (iFFT) to each block. A number of constellation points in each block corresponds to a number of subcarriers in each symbol. A temporal length of the symbol corresponds to an inverse of the subcarrier spacing.

When Multi-Input Multi-Output (MIMO) or Multi-User MIMO (MU-MIMO) transmission is used, the TxSP 310 may insert Cyclic Shift Diversities (CSDs) to prevent unintentional beamforming. The CSD may be specified per transmit chain or may be specified per space-time stream.

The CSD insertion may occur before or after the iFTs 342 and 344. In an embodiment, the CSD may be applied by the spatial mapper 334.

The first and second GI inserters 352 and 354 prepend a Guard Interval (GI) to the symbol. The TxSP 310 may optionally perform windowing to smooth edges of each symbol after inserting the GI.

A wide variety of electronic devices, circuits, firmware, software, and combinations thereof known in the art may be used to implement the functions of the spatial mapper 334, the iFTs 342 and 344, and the GI inserters 352 and 354.

The RF transmitter 360 includes first and second transmit chains 362 and 364. The transmit chains 362 and 364 convert the symbols output from the respective GI inserters 352 and 354 into respective first and second RF transmit signals. In an embodiment, one of the first and second transmit chains 362 and 364 may at times be disabled to save power.

The antenna unit 370 couples the first and second RF transmit signals output by the RF transmitter 360 to the first and second antennas 372 and 374. The antennas 372 and 374 couple the first and second RF transmit signals, respectively, to the wireless medium.

FIG. 4 illustrates operations of the diversity encoder 330 when STBC is used according to an embodiment. FIG. 4 illustrates a spatial stream 400 (SS) and corresponding first and second space-time streams 420 and 440 (STS1 and STS2). Each space-time-stream corresponds to a different transmitting antenna or a different beam of a beamformed antenna array.

The spatial stream SS includes a first input constellation point 412 corresponding to a first time slot 406 of a first subcarrier 402 and a second input constellation point 414 corresponding to a second time slot 408 of the first subcarrier 402. X1 represents a value of the first input constellation point 412, and $X_2$ represents a value of the second input constellation point 414.

The diversity encoder 330 generates the first space-time stream STS1 having first and second output constellation points 432 and 434 associated with a subcarrier 422 of first and second OFDM symbols 426 and 428, respectively. The first output constellation point 432 has a value corresponding to $X_1$. The second output constellation point 434 has a value corresponding to a negative of a complex conjugate of $X_2$ ($-X_2^*$).

The diversity encoder 330 generates the second space-time stream STS2 having third and fourth output constellation points 452 and 454 associated with a subcarrier 442 of third and fourth OFDM symbols 446 and 448, respectively. The third output constellation point 452 has a value corresponding to $X_2$. The fourth output constellation point 454 has a value corresponding to a complex conjugate of $X_1$ ($X_1^*$).

Figure 5:
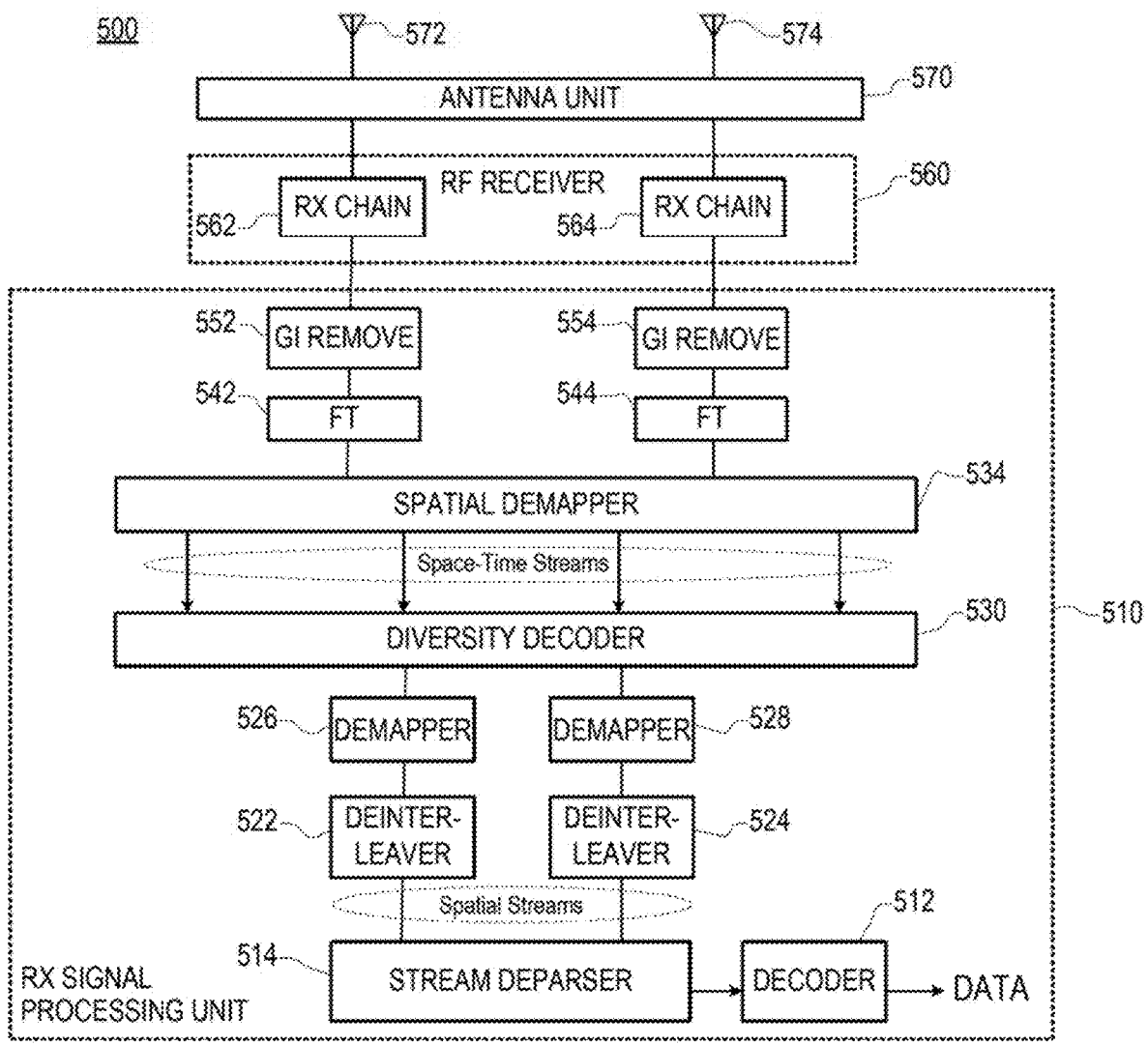
FIG. 5 illustrates components of a wireless device configured to receive data according to an embodiment.

FIG. 5 illustrates components of a wireless device 500 configured to receive data according to an embodiment, including a Receiver (Rx) Signal Processing Unit (RxSP) 510, an RF receiver 560, an antenna unit 570, and first and second antennas 572 and 574. The RxSP 510, RF receiver 560, and antenna unit 570 may be components of the receiving signal processing unit 226, RF receiver 245, and antenna unit 250 of the WLAN device 200 of FIG. 2 according to an embodiment. The antenna unit 570 and antennas 572 and 574 may also operate as the antenna unit 370 and antennas 372 and 374 of FIG. 3.

The antennas 572 and 574 receive first and second RF received signals, respectively, from the wireless medium. The antenna unit 570 couples the first and second RF received signals to the RF receiver 560.

The RF receiver 560 includes first and second receive chains 562 and 564. The receive chains 562 and 564 convert the first and second RF received signals into first and second received symbol streams, respectively.

Although FIG. 5 illustrates the wireless device 500 including two antennas 572 and 574 and two receive chains 562 and 564, embodiments are not limited thereto, and an embodiment may have one, three, four, or more receiving antennas and corresponding receive chains.

In an embodiment, the wireless device is a first wireless device receiving signals transmitted by a second wireless device, and a first number of antennas and receive chains used by the first wireless device to receive the signals is different from a second number of antennas and transmit chains used by the second wireless device to transmit the signals.

The Receiver (Rx) Signal Processing Unit (RxSP) 510 receives the first and second received symbol streams. The RxSP 510 includes first and second Guard Interval (GI) removers 552 and 554, first and second Fourier Transformers (FTs) 542 and 544, a spatial demapper 534, a diversity decoder 530, first and second demappers 526 and 528, first and second deinterleavers 522 and 524, a stream deparser 514, and a stream decoder 512.

In an embodiment, each of the illustrated components of the RxSP 510 performs a function corresponding to an inverse of a function performed by a corresponding illustrated component of the TxSP 310 of FIG. 3.

The Guard Interval (GI) removers 552 and 554 removes the GI from the symbol in the first and second received symbol streams, respectively.

The FTs 542 and 544 receive the first and second received symbol streams from the GI removers 552 and 554, respectively. The FTs 542 and 544 convert blocks of received symbols (that is, time domain blocks) in the first and second received symbol streams into blocks of the constellation points (that is, frequency domain blocks), respectively, by using a discrete Fourier transform (DFT) or a fast Fourier transform (FFT).

A number of constellation points in each frequency domain block corresponds to a number of subcarriers in each received symbol. A number of received symbols in each time domain blocks corresponds to the number of constellation points in each block.

The FTs 542 and 544 output the blocks of the constellation points as first and second constellation point streams, respectively.

The spatial demapper 534 reconstructs and outputs space-time streams when one or more of STBC, MIMO, and MU-MIMO is used to transmit the received signals. The space-time streams are associated with transmissions from respective antennas or from respective beams of a beamformed antenna array. Each space-time stream includes a plurality of constellation points.

The spatial demapper 534 may reconstruct first to fourth space-time streams using the first and second constellation point streams and a plurality of channel state information (CSI). The plurality of CSI may include CSI for each combination of a transmitting antenna used by the transmitting device to transmit a spatial stream as a plurality of space-time streams and the antennas used by a receiving device to receive the space-time streams.

For example, when a first spatial stream is transmitted by the device of FIG. 3 as first and second space-time streams using the transmitting device's first and second antennas 372 and 374 and the first and second space-time streams are received by the device of FIG. 5 using the receiving device's first and second receive antennas 572 and 574, a first plurality of CSI is used to reconstruct the first and second space-time streams. The first plurality of CSI includes CSI for a channel including the first antenna 372 and the first receive antenna 572, CSI for a channel including the first antenna 372 and the second receive antenna 574, CSI for a channel including the second antenna 374 and the first receive antenna 572, and CSI for a channel including the second antenna 374 and the second receive antenna 574.

The spatial demapper 534 outputs the first and second constellation point streams when none of STBC, MIMO, and MU-MIMO are used to transmit the received signals. A variety of circuits, software, algorithms, and combinations thereof are suitable for embodying the spatial demapper 534.

The diversity decoder 530 despreads the constellation points from the first to fourth space-time streams into first and second spatial streams.

The diversity decoder 530 may determine each output constellation point in the first and second spatial streams using a constellation point from each of two different space-time streams. For example, each constellation point in the first spatial stream may be determined using one constellation point from each of the first and second space-time streams. Each constellation point in the second spatial stream may be determined using one constellation point from each of the third and fourth space-time streams in the same manner as the constellation point in the first spatial stream are determined.

Each constellation point in the first spatial stream may be determined using a constellation point of the first space-time stream corresponding to a first time slot and a first subcarrier frequency and a constellation point of the second space-time stream corresponding to a second time slot and the first subcarrier frequency when STBC is used. For example, considering FIG. 4, a first constellation point of the first spatial stream may be determined using the first output constellation point 432 of the first space-time stream STS1 and the fourth output constellation point 454 of the second space-time stream STS2 when STBC is used.

A variety of circuits, software, algorithms, and combinations thereof that are suitable for determining the constellation points of the spatial streams produced by diversity decoder 530.

The demappers 526 and 528 demap the constellation points of the first and second spatial streams into bit streams, respectively. The demappers 526 and 528 may further perform LDPC tone demapping before the constellation demapping when LDPC is used.

The deinterleavers 522 and 524 deinterleave the bits of the first and second spatial streams received from the demappers 526 and 528, respectively, when BCC encoding is used.

The stream deparser 514 combines the spatial streams output from the deinterleavers 522 and 524.

The stream decoder 512 decodes the combined spatial streams output from the stream deparser 514. For example, the stream decoder 512 may be an FEC decoder. The FEC decoder may include a BCC decoder, an LDPC decoder, or both.

The RxSP 510 may further include a descrambler for descrambling the decoded data. The RxSP 510 may further include an encoder deparser for multiplexing the data decoded by a plurality of BCC decoders when BCC is used. The RxSP 510 may not use the encoder deparser when LDPC is used.

Figure 6:
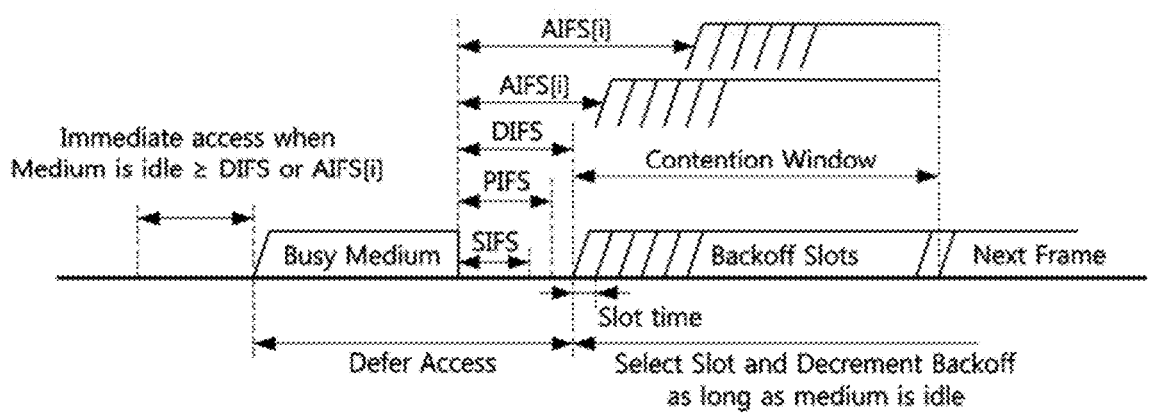
FIG. 6 illustrates Inter-Frame Space (IFS) relationships.

FIG. 6 illustrates Inter-Frame Space (IFS) relationships. FIG. 6 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time.

A data frame is used for transmission of data forwarded to a higher layer. The WLAN device transmits the data frame after performing backoff if a DIFS has elapsed during which DIFS the medium has been idle.

A management frame is used for exchanging management information, which is not forwarded to the higher layer. Subtype frames of the management frame include a beacon frame, an association request/response frame, a probe request/response frame, and an authentication request/response frame.

A control frame is used for controlling access to the medium. Subtype frames of the control frame include a request to send (RTS) frame, a clear to send (CTS) frame, and an acknowledgement (ACK) frame.

When the control frame is not a response frame of another frame, the WLAN device transmits the control frame after performing backoff if a DIFS has elapsed during which DIFS the medium has been idle. When the control frame is the response frame of another frame, the WLAN device transmits the control frame after a SIFS has elapsed without performing backoff or checking whether the medium is idle.

A WLAN device that supports a Quality of Service (QoS) functionality (that is, a QoS station) may transmit the frame after performing backoff if an AIFS for an associated access category (AC), (AIFS[AC]), has elapsed. When transmitted by the QoS station, any of the data frame, the management frame, and the control frame which is not the response frame may use the AIFS[AC] of the AC of the transmitted frame.

A WLAN device may perform a backoff procedure when the WLAN device that is ready to transfer a frame finds the medium busy. In addition, a WLAN device operating according to the IEEE 802.11n and 802.11ac standards may perform the backoff procedure when the WLAN device infers that a transmission of a frame by the WLAN device has failed.

The backoff procedure includes determining a random backoff time composed of N backoff slots, each backoff slot having a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device detects no medium activity for the duration of a particular backoff slot, the backoff procedure shall decrement the backoff time by the slot time. When the WLAN determines that the medium is busy during a backoff slot, the backoff procedure is suspended until the medium is again determined to be idle for the duration of a DIFS or EIFS period. The WLAN device may perform transmission or retransmission of the frame when the backoff timer reaches zero.

The backoff procedure operates so that when multiple WLAN devices are deferring and execute the backoff procedure, each WLAN device may select a backoff time using a random function, and the WLAN device selecting the smallest backoff time may win the contention, reducing the probability of a collision.

Figure 7:
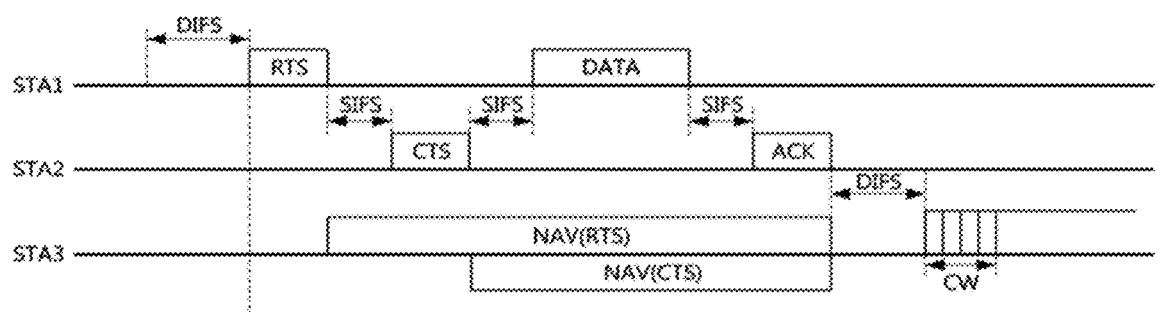
FIG. 7 illustrates a Carrier Sense Multiple Access/Collision Avoidance (CSMA/CA) based frame transmission procedure.

FIG. 7 illustrates a Carrier Sense Multiple Access/Collision Avoidance (CSMA/CA) based frame transmission procedure for avoiding collision between frames in a channel according to an embodiment. FIG. 7 shows a first station STA1 transmitting data, a second station STA2 receiving the data, and a third station STA3 that may be located in an area where a frame transmitted from the STA1, a frame transmitted from the second station STA2, or both can be received. The stations STA1, STA2, and STA3 may be WLAN devices.

The STA1 may determine whether the channel is busy by carrier sensing. The STA1 may determine the channel occupation based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the STA1 may transmit a Ready-To-Send (RTS) frame to the second station STA2. Upon receiving the RTS frame, after a SIFS the second station STA2 may transmit a Clear-To-Send (CTS) frame as a response of the RTS frame. If Dual-CTS is enabled and the second station STA2 is an AP, the AP may send two CTS frames in response to the RTS frame: a first CTS frame in the legacy non-HT format, and a second CTS frame in the HT format.

When the third station STA3 receives the RTS frame, it may set a NAV timer of the third station STA3 for a transmission duration of subsequently transmitted frames (for example, a duration of SIFS+CTS frame duration+ SIFS+data frame duration+SIFS+ACK frame duration) using duration information included in the RTS frame. When the third station STA3 receives the CTS frame, it may set the NAV timer of the third station STA3 for a transmission duration of subsequently transmitted frames using duration information included in the CTS frame. Upon receiving a new frame before the NAV timer expires, the third station STA3 may update the NAV timer of the third station STA3 by using duration information included in the new frame. The third station STA3 does not attempt to access the channel until the NAV timer expires.

When the STA1 receives the CTS frame from the second station STA2, it may transmit a data frame to the second station STA2 after SIFS elapses from a time when the CTS frame has been completely received. Upon successfully receiving the data frame, the second station STA2 may transmit an ACK frame as a response of the data frame after SIFS elapses.

When the NAV timer expires, the third station STA3 may determine whether the channel is busy using the carrier sensing. Upon determining that the channel is not used by other devices during a DIFS after the NAV timer has expired, the third station STA3 may attempt to access the channel after a contention window according to a backoff process elapses.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame.

FIG. 8A illustrates an HE PPDU 800 according to an embodiment. A transmitting station generates the HE PPDU frame 800 and transmits it to one or more receiving stations. The receiving stations receive, detect, and process the HE PPDU frame 800.

The HE PPDU frame 800 includes a Legacy Short Training Field (L-STF) field 802, a Legacy (i.e., a Non-High Throughput (Non-HT)) Long Training Field (L-LTF) 804, and a Legacy Signal (L-SIG) field 806, which together comprise a legacy preamble 801, and a Repeated L-SIG field (RL-SIG) 808. The L-STF 804 of a non-trigger-based PPDU has a periodicity of 0.8 µs with 10 periods.

The HE PPDU frame 800 also includes an HE-SIG-A field 810, an optional HE-SIG-B field 812, an HE-STF 814, an HE-LTF 816, and an HE-Data field 818.

The legacy preamble 801, the RL-SIG field 808, the HE-SIG-A field 810, and the HE-SIG-B field 812 when present, comprise a first part of the HE PPDU frame 800. In an embodiment, the first part of the HE PPDU frame 800 is decoded using a 64-element Discrete Fourier Transform (DFT), having a basic subcarrier spacing of 312.5 KHz.

The HE-SIG-A field 810 is duplicated on each 20 MHz segment after the RL-SIG field 808 to indicate common control information. The HE-SIG-A field 810 includes a plurality of OFDM HE-SIG-A symbols 820 each having a duration (including a Guard Interval (GI)) of 4 µs. A number of the HE-SIG-A symbols 820 in the HE-SIG-A field 810 is indicated by $N_{HESIGA}$ and is either 2 or 4.

The HE-SIG-B field 812 is included in Down-Link (DL) Multi-User (MU) PPDUs. The HE-SIG-B field 812 includes a plurality of OFDM HE-SIG-B symbols 822 each having a duration including a Guard Interval (GI) of 4 µs. In embodiments, Single User (SU) PPDUs, Up-Link (UL) MU PPDUs, or both do not include the HE-SIG-B field 812. A number of the HE-SIG-B symbols 822 in the HE-SIG-B field 812 is indicated by $N_{HESIGB}$ and is variable.

When the HE PPDU 800 has a bandwidth of 40 MHz or more, the HE-SIG-B field 812 may be transmitted in first and second HE-SIG-B channels 1 and 2. The HE-SIG-B field in the HE-SIG-B channel 1 is referred to as the HE-SIG-B1 field, and the HE-SIG-B field in the HE-SIG-B channel 2 is referred to as the HE-SIG-B2 field. The HE- SIG-B1 field and the HE-SIG-B2 field are communicated using different 20 MHz bandwidths of the HE PPDU 800, and may contain different information. Within this document, the term "HE-SIG-B field" may refer to an HE-SIG-B field of a 20 MHz PPDU, or to either of an HE-SIG-B1 field or HE-SIG-B2 field of a 40 MHz or more PPDU.

An HE-STF 814 of a non-trigger-based PPDU has a periodicity of 0.8 μs with 5 periods. A non-trigger-based PPDU is a PPDU that is not sent in response to a trigger frame. An HE-STF 814 of a trigger-based PPDU has a periodicity of 1.6 μs with 5 periods. Trigger-based PPDUs include UL PPDUs sent in response to respective trigger frames.

The HE-LTF 816 includes one or more OFDM HE-LTF symbols 826 each having a duration of 12.8 μs plus a Guard Interval (GI). The HE PPDU frame 800 may support a 2xLTF mode and a 4xLTF mode. In the 2xLTF mode, an HE-LTF symbol 826 excluding a Guard Interval (GI) is equivalent to modulating every other tone in an OFDM symbol of 12.8 μs excluding the GI, and then removing the second half of the OFDM symbol in a time domain. A number of the HE-LTF symbols 826 in the HE-LTF field 816 is indicated by $N_{HELTF}$, and is equal to 1, 2, 4, 6, or 8.

The HE-Data field 818 includes one or more OFDM HE-Data symbols 828 each having a duration of 12.8 μs plus a Guard Interval (GI). A number of the HE-Data symbols 828 in the HE-Data field 818 is indicated by $N_{DATA}$ and is variable.

FIG. 8B shows a Table 1 indicating additional properties of the fields of the HE PPDU frame 800 of FIG. 8A, according to an embodiment.

The descriptions below, for sake of completeness and brevity, refer to OFDM-based 802.11 technology. Unless otherwise indicated, a station refers to a non-AP HE STA, and an AP refers to an HE AP.

The solutions provided herein have been described with reference to a wireless LAN system; however, it should be understood that these solutions are also applicable to other network environments, such as cellular telecommunication networks, wired networks, etc.

An embodiment of the invention may be an article of manufacture in which a non-transitory machine-readable medium (such as microelectronic memory) has stored thereon instructions which program one or more data processing components (generically referred to here as a "processor" or "processing unit") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment of the invention may be an apparatus (e.g., an AP STA, a non-AP STA, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

The distributed nature of channel access network such as IEEE 802.11 WLANs makes the carrier sense mechanism very important for collision free operation. The physical carrier sense of one STA is responsible for detecting the transmissions of other STAs. But it may be impossible to detect every single case in some circumstance. For example, one STA which may be long distance away from another STA may see the medium as idle and begin transmitting frame as well. To overcome this hidden node, NAV (Network Allocation Vector) has been introduced. However, as IEEE 802.11 standard evolves to include multiple users' simultaneous transmission/reception scheduled within a BSS such as UL/DL MU transmission in cascaded manner, modified or newly defined mechanism may be needed. In this invention, multi-user (MU) transmission refers to cases that multiple frames are transmitted to or from multiple STAs simultaneously using different resources, wherein examples of different resources are different frequency resources in OFDMA transmission and different spatial streams in MU-MIMO transmission. Therefore, DL-OFDMA, DL-MU-MIMO, UL-OFDMA, and UL-MU-MIMO are examples of MU transmission.

Different from DL MU-MIMO defined in IEEE 802.11ac standard, IEEE 802.11ax standard may require more protection mechanisms for MU transmission due to several reasons. The first reason is that IEEE 802.11ax operation scenario is different, such that it also considers denser wireless environment, and outdoor support. Also, the coverage of IEEE 802.11ax BSS may be larger compared to IEEE 802.11ac. All these factors require more robust protection mechanisms. The second reason is that IEEE 802.11ax supports not only DL MU transmission but also UL MU transmission. In case of UL MU transmission, as frames transmitted from each STA is larger, it requires more protection close to each transmitting STAs. Another reason is that in IEEE 802.11ax environment, AP may want to have more control of the medium by use of more scheduled access mechanism, which may anticipate more frequent use of OFDMA/MU-MIMO transmissions.

UL MU PPDUs (MU-MIMO or OFDMA) are sent as a response to a Trigger frame sent by the AP. Trigger frame may have enough STA specific information and assigned resource units to identify the STAs which are supposed to transmit UL MU PPDUs.

FIG. 9 illustrates a Trigger frame 900 according to an embodiment. The Trigger frame 900 is used to allocate resource for UL MU transmission and to solicit an UL MU transmission after the PPDU that carries the Trigger frame 900. The Trigger frame also carries other information required by the responding STA to send the UL MU transmission.

The Trigger frame 900 includes a Common Info field 910 and one or more User Info fields 912-1 to 912-N. The Receive station Address (RA) field 906 of the Trigger frame 900 is the address of the recipient STA when the Trigger frame 900 has one User Infor field 912-1. The RA field 906 of the Trigger frame 900 is a broadcast address when the Trigger Frame 900 has multiple User Info field 912-1 to 912-N. The Transmitting station Address (TA) field 908 is the address of the STA transmitting the Trigger frame 900.

FIG. 10 illustrates a Common Info field 1010 of a Trigger frame, such as the Trigger Frame 900 of FIG. 9, according to an embodiment. The Common Info field includes a Trigger Type subfield 1020, a length subfield 1022, a Cascade Indication subfield 1024, a CS Required subfield 1026, a Cyclic Prefix (CP) and LTF type subfield 1030, a Space Time Block Coding (STBC) field 1036, and a HE-SIG-A Reserved subfield 1046, among others.

The Trigger Type subfield 1020 of the Common Info field 1010 indicates the type of the Trigger frame. The Trigger frame can include an optional type-specific Common Info and optional type-specific Per User Info. FIG. 11 shows a Table 2 of Trigger Type subfield 1020 encoding values that define the valid Trigger Type.

The Length subfield 1022 of the Common Info field 1010 indicates the value of the L-SIG Length field of the HE trigger-based PPDU that is the response to the Trigger frame.

If the Cascade Indication subfield 1024 of the Common Info field 1010 is 1, then a subsequent Trigger frame follows the current Trigger frame. Otherwise the Cascade Indication subfield is 0.

The CS Required subfield 1026 of the Common Info field 1010 is set to 1 to indicate that the STAs identified in the Per User Info fields of the Trigger frame are required to use Energy Detection (ED) to sense the medium and to consider the medium state and the NAV in determining whether or not to respond. The CS Required subfield is set to 0 to indicate that the STAs identified in the Per User Info fields are not required consider the medium state or the NAV in determining whether to respond.

The CP and LTF Type subfield 1030 of the Common Info field 1010 indicates the CP and HE-LTF type of the HE trigger-based PPDU response. The CP and LTF subfield encoding is defined in Table 3 shown in FIG. 12.

The STBC subfield 1036 of the Common Info field 1010 indicates the status of STBC encoding of the HE trigger-based PPDU response solicited by the Trigger frame 900. It is set to 1 if STBC encoding is used and set to 0 otherwise.

The HE-SIG-A Reserved subfield 1046 of the Common Info field 1010 indicates the content of the HE-SIG-A field of the HE trigger-based PPDU response. The values of the HE-SIG-A Reserved subfield 1046 are set to 1 and correspond to the bits B7 to B15 in the HE-SIG-A2 subfield of the HE trigger-based PPDU with B54 in the Trigger frame corresponding to B7 in the HE-SIG-A2 subfield of the HE trigger-based PPDU, B55 corresponding to B8, and so on.

FIG. 13 shows a Table 4 of frequently used parameters in the equations herein.

In the time domain waveform of the HE trigger-based PPDU transmitted by user u in the r-th RU, each field is defined as below.

$$r_{Field}^{(i_{Seg}, iTX)}(t) = \qquad \text{Eq. 3}$$

$$\frac{\beta_r^{Field}}{\sqrt{N_{Norm,r}}} w_{T_{Field}}(t) = \sum_{k \in K_r}^{\eta_{Field,k}} \sum_{m=1}^{N_{STS,r,u}} \left[ Q_k^{(i_{Seg})} \right]_{iTX(M_{r,u}+m)} \gamma_{k,BW} \cdot$$

$$X_{k,r,u}^{(i_{Seg},m)} \exp(j 2\pi k \Delta_{F,Field}(t - T_{GI,Field} - T_{CS,HE}(M_{r,u} + m)))$$

wherein $N_{Norm,r}$ is $N_{TX}$ or $N_{STS,r,total}$ for pre-HE modulated fields or HE modulated fields, respectively, and $w_{T_{Field}}(t)$ is a windowing function. $\eta_{Field,k}$ is the power boost factor of the k-th subcarrier of a given field within an OFDM symbol. $\alpha_r$ is the power boost factor for the r-th RU in an HE PPDU. $\beta_r^{Field}$ is the power normalization factor.

For pre-HE modulated fields, Kr is the set of subcarriers indices from $-N_{SR}$ to $N_{SR}$ excluding DC subcarriers. FIG. 14 shows a Table 5 of number of subcarriers (per side of the center carrier) $N_{SR}$ values according to the bandwidth of a transmission for fields in the transmission.

FIG. 15 shows a Table 6 of a number of tones per field $N_{Field}^{Tone}$ by bandwidth and field.

$Q_k^{(i_{Seg})}$ is the spatial mapping matrix for the subcarrier k in frequency segment $i_{Seg}$. For HE modulated fields, $Q_k^{(i_{Seg})}$ is a matrix with $N_{TX}$ rows and $N_{STS,r,total}$ columns. $\Delta_{F,Field}$ is the subcarrier frequency spacing. $X_{k,r,u}^{(i_{Seg},m)}$ is the frequency-domain symbol in subcarrier k of user u in the r-th RU for frequency segment $i_{Seg}$ of space-time stream m. $T_{GI,Field}$ is the guard interval duration used for each OFDM symbol in the field.

For pre-HE modulated fields, $T_{CS,HE}(1)=0$. For HE modulated fields, $T_{CS,HE}(1)$ represents the cyclic shift per space-time stream.

$Y_{k,BW}$ is used to represent tone rotation. The value of BW in $Y_{k,BW}$ is determined by the TXVECTOR parameter CH_BANDWIDTH as shown in Table 7 of FIG. 16.

The transmit chain of HE-LTF can be described by the equation shown in FIG. 17. $Q_{m,n}$ in FIG. 17 indicates the element in row m and column n of beamforming matrix, where $1 \leq m \leq Ntx$ and $1 \leq n \leq Nsts$. Ntx and Nsts mean the number of transmit chain and number of space-time stream, respectively. C indicates cyclic shift values wherein the cyclic shifts are applied sequentially across the space-time streams as follows: the cyclic shift of the space-time stream number m is given by $\tau_m$. P is an orthogonal mapping matrix consisting of ±1 having different respective HE-LTF sequences for different space-time streams. The equation shown in FIG. 17 shows the first space-time stream of HE LTF sequence which multiplied by the first column of P. k means k-th subcarrier of the OFDM symbol.

FIG. 18 includes a Table 8 illustrating formats of an HT Control field according to an embodiment. The HT Control field includes 32 bits. HT Control fields are included in Control Wrapper frames. HT Control fields are included in QoS data or management frame.

As shown in FIG. 18, the HT Control field has three forms: the HT variant, the VHT variant and the HE variant. These forms differ in the values of the VHT and HE subfields and in their formats as shown in FIG. 18. The values of a bit 0 (B0), the VHT subfield, and a bit 1 (B1), the HE subfield, of the HT Control field indicate the variant of the HT Control field. The VHT subfield is set to 0 to indicate an HT variant HT Control field. The VHT subfield is set to 1 and the HE subfield is set to 0 to indicate a VHT variant HT Control field. The VHT subfield is set to 1 and the HE subfield is set to 1 to indicate an HE variant HT Control field. The HE variant of the HT Control field includes an HE Aggregated Control (A-Control) subfield.

FIG. 19A illustrates the format of the HE A-Control subfield 1900 of the HE variant of the HT Control field, according to an embodiment. HE A-Control subfield 1900 includes one or more Control fields 1922-1 to 1922-N and a Padding field 1924. Each of the Control fields 1922-1 to 1922-N includes a Control ID subfield 1930 that identifies the type of control information included in the Control field. Each of the Control fields 1922-1 to 1922-N may also include 0 or more bits of Control Information 1932. The size and contents of the Control Information 1932 depend on the value of the respective Control ID subfield 1930, as shown in Table 9 of FIG. 19B. Section numbers in FIG. 19B refer to the IEEE 802.11ax draft standard as of the date of the invention.

FIG. 20 illustrates Control Information 2032 for a HE A-Control subfield Control Field having a Control ID corresponding to Operating Mode (i.e., 1), according to an embodiment. As shown in FIG. 19B, the Control Information 2032 includes 12 bits. The Control Information 2032 contains information related to the operating mode change of the STA transmitting the frame containing this information.

The Operating Mode variant of the Control subfield (having Control ID=1) allows STAs to dynamically adapt the number of active transmitter, receiver, and antenna chains and the channel width for receiving subsequent PPDUs, and to communicate those adaptations to other STAs, including APs. The Rx NSS subfield 2002 indicates the maximum number of spatial streams, $N_{SS\_RX}$, that the STA can receive and is set to $N_{SS\_RX}$−1. The Channel Width subfield 2004 indicates the operating channel width supported by the STA in reception, and is set to 0 for 20 MHz, 1 for 40 MHz, 2 for 80 MHz, and 3 for 160 MHz and 80+80 MHz. The UL MU Disable subfield 2006 indicates whether UL MU operation is suspended or resumed by the non-AP STA. The UL MU Disable subfield 2006 is set to 1 to indicate that UL MU operation is suspended; otherwise it is set to 0 to indicate that UL MU operation is resumed. An AP sets the UL MU Disable subfield 2006 to 0. Bits 9, 10, and 11 are reserved.

The Tx NSTS subfield 2008 provides an indication of a maximum number of space-time streams that the STA can transmit $N_{STS\_TX}$. The maximum number of transmittable space-time streams $N_{STS\_TX}$ is a function of the number of the number of transmit chains and associated antennas that will be active in the STA.

The maximum number of transmittable space-time streams $N_{STS\_TX}$ is related to but not the same as a maximum number of spatial streams that the STA can transmit $N_{SS\_TX}$, and is related to but not the same as a number of enabled transmit chains in the STA. For example, when a number of spatial streams to transmit is 1 and STBC is supported and employed, the number of space-time streams to transmit is 2, as shown in FIG. 4. Transmitting two space-time streams requires two transmit chains be enabled. However, if two transmit chains are enabled, then two spatial streams can be transmitted when STBC is not employed.

As a result, the number of transmit chains that are enabled in a STA does not determine of the maximum number of spatial streams that the STA can transmit $N_{SS\_TX}$ unless whether STBC is employed is also known. Therefore, the maximum number of spatial streams that the STA can transmit $N_{SS\_TX}$ is not representative of the number of active transmit chains of the STA. However, maximum number of space-time streams that the STA can transmit $N_{STS\_TX}$ does indicate the number of enabled (active) transmit chains.

With the ability to communicate the above parameters, in an HE A-Control subfield, a STA can dynamically minimize the number of active transmit and receive chains and a bandwidth, and thereby save power. The use of the HE A-Control subfield to communicate these parameters also improves MAC efficiency based on reducing the exchange of Management frames without delay.

In an embodiment, in order to adjust dynamically the number of active transmit chain, a STA transmits a control information subfield corresponding to a number of space-time stream of transmit chain TX NSTS. As shown in FIG. 20, a TX NSTS subfield is included in HE A-Control subfield when the STA transmits control information for transmit operating mode change of its STA wherein the TX NSTS indicates the maximum number of space-time streams that may be transmitted.

For example, if the TX NSTS subfield indicates one active transmit chain with one space-time stream, AP is not allowed to request STBC operation. If the TX NSTS subfield indicates two active transmit chains with two space-time streams, AP is allowed to request STBC operation.

Figure 21:
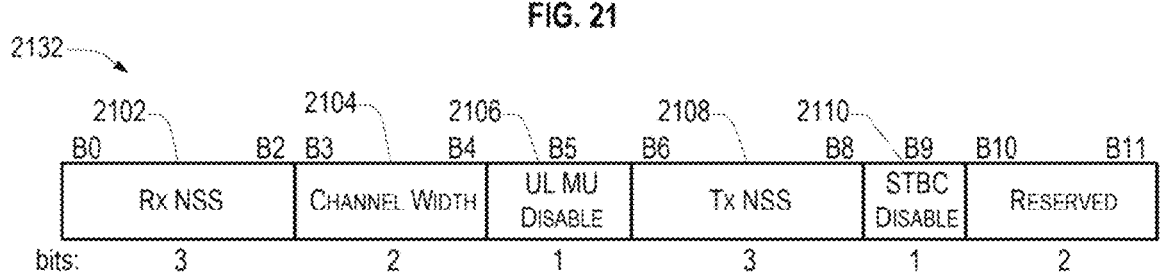
FIG. 21 illustrates Control Information for an HE A-Control Operating Mode Control Field according to another embodiment.

FIG. 21 illustrates Control Information 2132 for a HE A-Control subfield Control Field having a Control ID corresponding to Operating Mode (i.e., 1), according to another embodiment. The Control Information 2132 has 12 bits and includes an Rx NSS subfield 2102, a Channel Width subfield 2104, and an UL MU Disable subfield 2106, each of which is as described for the like-named fields in FIG. 20. Bits B10 and B11 are reserved.

The Control Information 2132 includes a TX NSS field 2108 that communicates a number of spatial streams that may be transmitted by the STA that transmitted the Control Information 2132. The Control Information 2132 also includes a STBC disabled subfield 2110 that indicate whether a STBC operation is available or not when the STA dynamically adjusts the number of active transmit chains.

Figure 22:
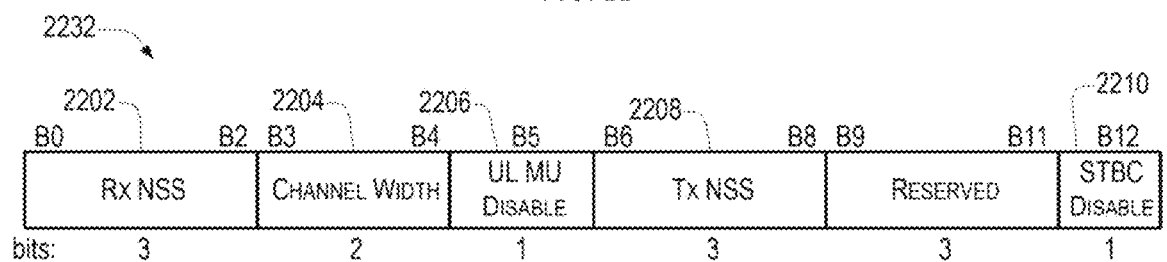
FIG. 22 illustrates Control Information for an HE A-Control Operating Mode Control Field according to another embodiment.

FIG. 22 illustrates Control Information 2232 for a HE A-Control subfield Control Field having a Control ID corresponding to Operating Mode (i.e., 1), according to another embodiment. The Control Information 2232 has 13 bits and includes an Rx NSS subfield 2202, a Channel Width subfield 2204, an UL MU Disable subfield 2206, and a TX NSS field 2208 each of which is as described for the like-named fields in FIG. 21. Bits B9 through B11 are reserved.

The Control Information 2232 also includes a STBC disabled subfield 2210 as the thirteenth bit that indicate whether a STBC operation is available or not when the STA dynamically adjusts the number of active transmit chains.

For the embodiments of FIGS. 21 and 22, the STBC disabled subfield is included in HE A-Control subfield when the STA transmits control information for transmit operating mode change of its STA. An AP is not allowed to request STBC operation by the STA when the STBC disabled subfield sets to 1. The AP is allowed to request STBC operation when the STBC disabled subfield is set to 0.

In another embodiment of the invention, the Control Information for a HE A-Control subfield Control Field having a Control ID corresponding to Operating Mode (i.e., 1) is as shown in FIG. 21 but without the STBC disabled subfield 2110, and an AP may not request a STA perform a transmission using STBC when the STA indicated in the TX $N_{SS}$ field 2108 that the number of spatial streams it is currently able to transmit is one.

For example in FIG. 10 the STBC subfield 1036 in the Common Info field 1010 in a Trigger frame should set to 0 when the AP doesn't have enough information to definitively determine whether the STA currently has enough active transmit chains available to perform STBC. When the value of the TX NSS field 2108 is set to 1 (and in this embodiment, no STBC disable field is available), the number of active transmit chain could be two or one such that AP doesn't have enough information to definitively determine whether the STA currently has enough active transmit chains available to perform STBC.

Figure 23:
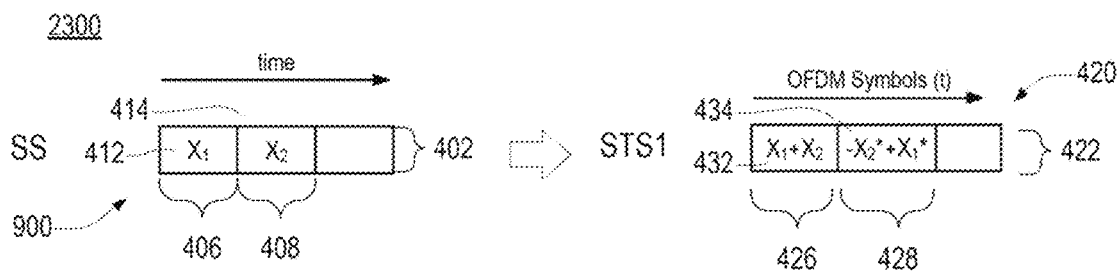
FIG. 23 illustrates a process for responding to an STBC transmission request when only a single transmit chain is available according to an embodiment.

FIG. 23 illustrates operation of an STA when an AP requests STBC operation from a STA wherein only one active antenna is available, according to an embodiment.

A combination 432 ($x_1+x_2$) of a first data 412 ($x_1$) and a second data 414 ($x_2$) is transmitted from the available transmit chain in a first time slot. A combination 434 of the second data 414 negated and conjugated ($-x_2^*$) and the first data 412 conjugated ($x_1^*$) is transmitted from the available transmit chain in a second time slot.

In a receiver side, the estimate of the transmitted signals during two time slots are in $$\begin{bmatrix} \hat{x}_1 \\ \hat{x}_2 \end{bmatrix} = (H^H H)^{-1} H^H \begin{bmatrix} r_1 \\ r_2^* \end{bmatrix} = \qquad \text{Eq. 4}$$

$$(H^H H)^{-1} H^H \left( H \begin{bmatrix} x_1 \\ x_2 \end{bmatrix} + \begin{bmatrix} n_1 \\ n_2^* \end{bmatrix} \right) = \begin{bmatrix} x_1 \\ x_2 \end{bmatrix} + (H^H H)^{-1} H^H \begin{bmatrix} n_1 \\ n_2^* \end{bmatrix}$$

wherein $h_1$ is the channel characteristic between the transmitting antenna and the receiving antenna, $$r_1 = h_1 x_1 + h_1 x_2 + n_1,\ r_2 = h_1 x_2^* + h_1 x_1^* + n_2,\ \text{and } H = \begin{bmatrix} h_1 & h_1 \\ h_1^* & -h_1^* \end{bmatrix}.$$

In an embodiment, the time domain waveform $r_{He-Data}^{(iSeg)}(t)$ of the Data field of an HE trigger-based PPDU for user u in the r-th RU from transmit chain $i_{TX}$, is described by:

$$r_{HE-Data}^{(iSeg)}(t) = \qquad \text{Eq. 5}$$

$$\frac{1}{\sqrt{2}\sqrt{|K_r|}} \sum_{i_{TX}=0}^{1} \sum_{n=0}^{N_{SYM}-1} w_{T_{HE-DATA}}(t - nT_{SYM}) \frac{1}{\sqrt{N_{STS,r,total}}} \cdot$$

$$\sum_{k=K_r} \sum_{m=1}^{N_{STS,r,u}} \left( \left[ Q_k^{(iSeg)} \right]_{i_{TX}(M_{r,u}+m)} \left( \tilde{D}_{k,m,n,r}^{(iSeg,u)} + P_{n+4} P_n^k \right) \cdot \right.$$

$$\exp(j2\pi\Delta_{F,HE}(t - nT_{HE-LTF} -$$

$$\left. T_{GI,Data} - T_{CS,HE}(M_{r,u}+m))) \right)$$

$$r_{HE-Data}^{(iSeg)}(t) = \qquad \text{Eq. 6}$$

$$\frac{1}{\sqrt{2}\sqrt{|K_r|}} \sum_{n=0}^{N_{SYM}-1} w_{T_{HE-DATA}}(t - nT_{SYM}) \frac{1}{\sqrt{N_{STS,r,total}}} \cdot$$

$$\sum_{i_{TX}=0}^{1} \sum_{k=K_r} \sum_{m=1}^{N_{STS,r,u}} \left( \left[ Q_k^{(iSeg)} \right]_{i_{TX}(M_{r,u}+m)} \left( \tilde{D}_{k,m,n,r}^{(iSeg,u)} + P_{n+4} P_n^k \right) \cdot \right.$$

$$\exp(j2\pi\Delta_{F,HE}(t - nT_{HE-LTF} -$$

$$\left. T_{GI,Data} - T_{CS,HE}(M_{r,u}+m))) \right)$$

$$r_{HE-Data}^{(iSeg)}(t) = \qquad \text{Eq. 7}$$

$$\frac{1}{\sqrt{2}\sqrt{|K_r|}} \sum_{n=0}^{N_{SYM}-1} w_{T_{HE-DATA}}(t - nT_{SYM}) \frac{1}{\sqrt{N_{STS,r,total}}} \cdot$$

$$\sum_{k=K_r} \sum_{i_{TX}=0}^{1} \sum_{m=1}^{N_{STS,r,u}} \left( \left[ Q_k^{(iSeg)} \right]_{i_{TX}(M_{r,u}+m)} \left( \tilde{D}_{k,m,n,r}^{(iSeg,u)} + P_{n+4} P_n^k \right) \cdot \right.$$

$$\exp(j2\pi\Delta_{F,HE}(t - nT_{HE-LTF} -$$

$$\left. T_{GI,Data} - T_{CS,HE}(M_{r,u}+m))) \right)$$

where $P_n$ is defined as the sequence to control the polarity of the pilot subcarriers which is a cyclic extension of the 127 elements sequence and is given by p0 . . . 126v={1,1,1,1, −1,−1,−1,1, −1, −1, −1, −1, 1,1, −1,1, −1, −1,1,1, −1,1,1,1, 1,1, −1,1, 1,1, −1,1, 1, −1, −1,1, 1,1, −1, 1, −1, −1, −1,1, −1,1, −1, −1, 1, −1, −1,1, 1,1,1,1, −1, −1,1,1, −1,1,1, −1, −1,1, −1, −1,1, 1,1,1, 1, −1, −1, −1, −1, −1,1, 1, −1,1, −1,1, 1, −1, −1, −1, −1,1, −1,1, 1, −1,1, −1,1, 1,1,1, −1, −1, −1, −1, −1,1,1,1, 1, −1, −1,1,1,1, −1, −1, −1, −1, −1, −1, −1, −1, −1,1, 1, −1,1,1,1, −1, −1,1, −1, −1, −1,1,1,1,1, −1, −1, −1, −1, −1, −1, −1, −1, −1, −1, −1}. $P_n^k$ is a pilot for the subcarrier k for symbol n.

$$\tilde{D}_{k,m,n,r}^{(iSeg,u)}$$

is the transmitted constellation for user u in the r-th RU at subcarrier k, space-time-stream m, and Data field OFDM symbol n.

In an embodiment, the time domain waveform $r_{He-Data}^{(iSeg)}(t)$ of the HE-LTF field of an HE trigger-based PPDU for user u in the r-th RU, transmitted on frequency segment $i_{Seg}$ of transmit chain $i_{TX}$ can be as described by one of the following three equations, depending on the implementation:

$$r_{HE-LTF}^{(iSeg)}(t) = \frac{1}{\sqrt{2}\sqrt{N_{STS,r,total}}|K_r^{HE-LTF}|} \qquad \text{Eq. 8}$$

$$\sum_{i_{TX}=0}^{1} \sum_{n=0}^{N_{HE-LTF}-1} w_{T_{HE-LTF}}(t - nT_{SYM}) \cdot$$

$$\sum_{k=K_r} \sum_{m=1}^{N_{STS,r,u}} \left( \left[ Q_k^{(iSeg)} \right]_{i_{TX}(M_{r,u}+m)} [A_{HE-LTF}^k]_{(M_{r,u}+m),(n+1)} \right.$$

$$HELTF_k^{''} \cdot \exp(j2\pi\Delta_{F,HE}($$

$$\left. t - nT_{HE-LTF} - T_{GI} - T_{CS,HE}(M_{r,u}+m))) \right)$$

$$r_{HE-LTF}^{(iSeg)}(t) = \qquad \text{Eq. 9}$$

$$\frac{1}{\sqrt{2}\sqrt{N_{STS,r,total}}|K_r^{HE-LTF}|} \sum_{n=0}^{N_{HE-LTF}-1} w_{T_{HE-LTF}}(t - nT_{SYM}) \cdot$$

$$\sum_{k=K_r} \sum_{i_{TX}=0}^{1} \sum_{m=1}^{N_{STS,r,u}} \left( \left[ Q_k^{(iSeg)} \right]_{i_{TX}(M_{r,u}+m)} [A_{HE-LTF}^k]_{(M_{r,u}+m),(n+1)} \right.$$

$$HELTF_k^{''} \cdot \exp(j2\pi\Delta_{F,HE}(t - nT_{HE-LTF} -$$

$$\left. T_{GI} - T_{CS,HE}(M_{r,u}+m))) \right)$$

$$r_{HE-LTF}^{(iSeg)}(t) = \frac{1}{\sqrt{2}\sqrt{N_{STS,r,total}}|K_r^{HE-LTF}|} \qquad \text{Eq. 10}$$

$$\sum_{i_{TX}=0}^{1} \sum_{n=0}^{N_{HE-LTF}-1} w_{T_{HE-LTF}}(t - nT_{SYM}) \cdot$$

$$\sum_{k=K_r} \sum_{m=1}^{N_{STS,r,u}} \sum_{i_{TX}=0}^{1} \left( \left[ Q_k^{(iSeg)} \right]_{i_{TX}(M_{r,u}+m)} [A_{HE-LTF}^k]_{(M_{r,u}+m),(n+1)} \right.$$

$$HELTF_k^{''} \cdot \exp(j2\pi\Delta_{F,HE}($$

$$\left. t - nT_{HE-LTF} - T_{GI} - T_{CS,HE}(M_{r,u}+m))) \right)$$

where:

$$A_{HE-LTF}^k = \qquad \text{Eq. 11}$$
$$\begin{cases} R_{HE-LTF}, & \text{if } k \in K_{Pilot} \text{ and single stream pilots are used,} \\ R_{HE-LTF}, & \text{otherwise} \end{cases}$$

$$[R_{HE-LTF}]_{m,n} = [P_{HE-LTF}]_{1,n}, 1 \le m, n \le N_{HE-LTF}, \qquad \text{Eq. 12}$$

$$P_{HE-LTF} = \begin{cases} P_{4\times 4}, & N_{HE-LTF} \le 4 \\ P_{6\times 6}, & N_{HE-LTF} = 5,6 \\ P_{8\times 8}, & N_{HE-LTF} = 7,8, \end{cases} \qquad \text{Eq. 13}$$

$$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix} \qquad \text{Eq. 14}$$

$$P_{6\times 6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix} P_{8\times 8} = \begin{bmatrix} P_{4\times 4} & P_{4\times 4} \\ P_{4\times 4} & -P_{4\times 4} \end{bmatrix}$$

$$w = \exp(-j2\pi/6), \text{ and} \qquad \text{Eq. 15}$$

$$HELTF_k^* = HELTF_k \qquad \text{Eq. 16}$$

where $HELTF_k$ is the k-th element of the common HE-LTF sequence.

Figure 24:
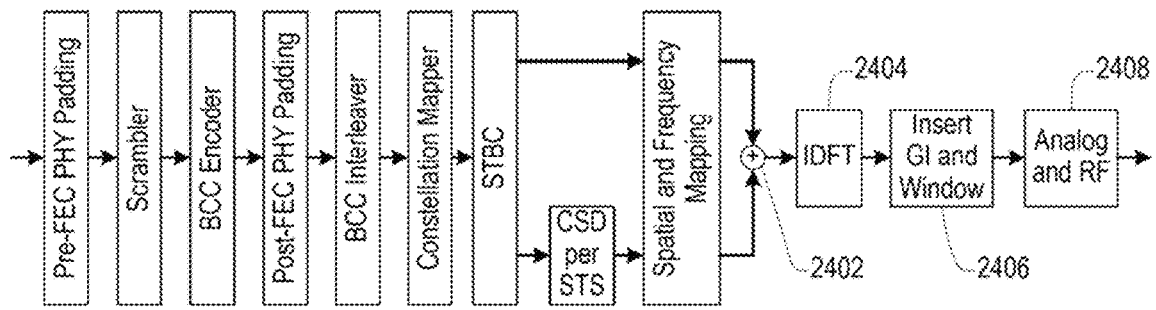
FIG. 24 illustrates a transmitter block for responding to an STBC transmission request using a single transmit chain according to an embodiment.

FIG. 24 illustrates an implementation example for a transmitter block 2400 based on the proposed embodiment. In this example, a STA has two or more transmit chains and indicated to its serving AP that its TX NSS equals to 1, but the AP assigned a trigger based PPDU transmission for the STA with STBC, BCC encoding, and a single spatial stream. As shown in the figure, the STA turns on at least the analog and RF circuit 2408 of a single TX chain. To transmit a STBC encoded frame with a single TX chain, the STA combines STBC mapped signal using a combining circuit 2402 before inverse Discrete Fourier Transform (IDFT) circuit 2404. By doing so, the STA can perform the STBC transmission using only a single TX chain beginning at the IDFT circuit 2404 and continuing through the GI Insertion and Windowing circuit 2406 and analog and RF circuit 2408, which saves power consumption.

Figure 25:
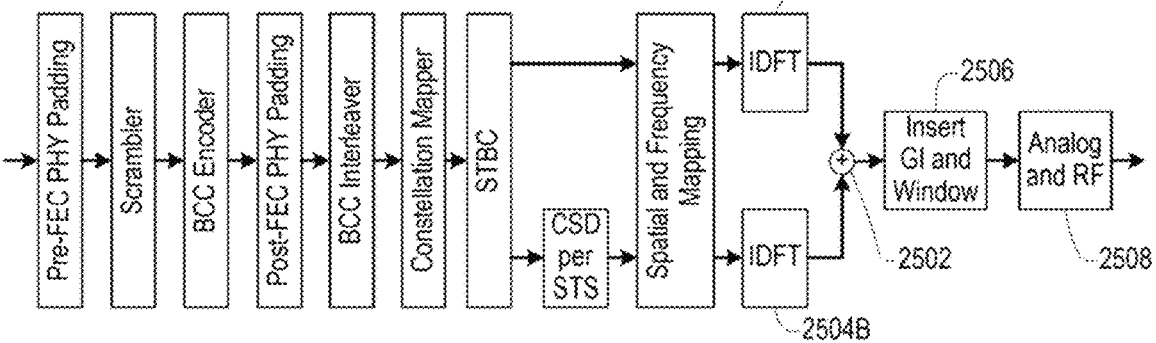
FIG. 25 illustrates a transmitter block for responding to an STBC transmission request using a single transmit chain according to an embodiment.

FIG. 25 illustrates another implementation example for a transmitter block 2500 based on the proposed embodiment. In this example, a STA has two or more transmit chains and indicated to its serving AP that its TX NSS equals to 1, but the AP assigned a trigger based PPDU transmission for the STA with STBC, BCC encoding, and a single spatial stream. As shown in the figure, the STA turns on at least the analog and RF circuit 2508 of a single TX chain. To transmit a STBC encoded frame with a single TX chain, the STA combines STBC mapped signal using a combining circuit 2502 after the per-space-time-stream inverse Discrete Fourier Transform (IDFT) circuits 2504A and 2504B and before the GI Insertion and Windowing circuit 2506. By doing so, the STA can perform the STBC transmission using only a single TX chain beginning at the GI Insertion and Windowing circuit 2506 and continuing through the analog and RF circuit 2508, which saves power consumption.

Figure 26:
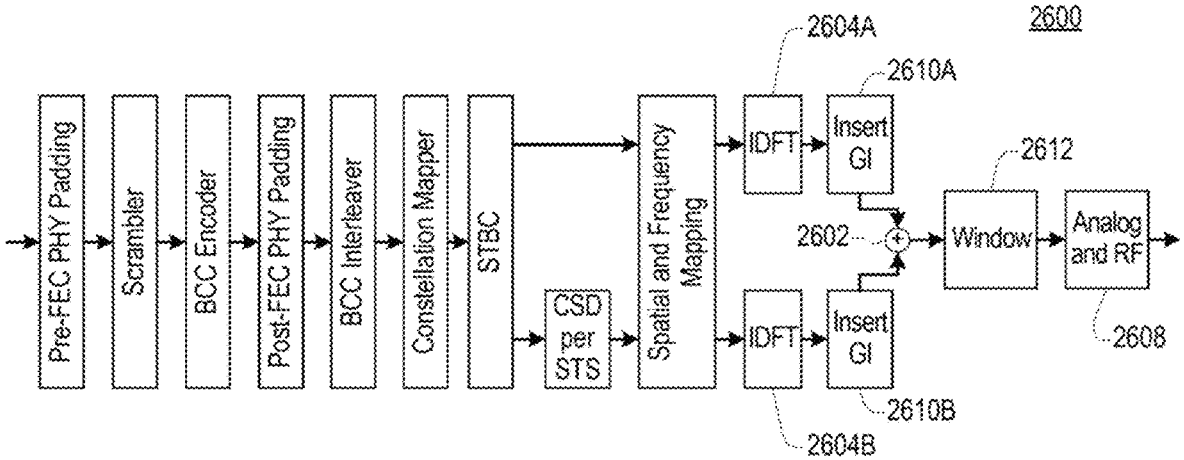
FIG. 26 illustrates a transmitter block for responding to an STBC transmission request using a single transmit chain according to an embodiment.

FIG. 26 illustrates another implementation example for a transmitter block 2600 based on the proposed embodiment. In this example, a STA has two or more transmit chains and indicated to its serving AP that its TX NSS equals to 1, but the AP assigned a trigger based PPDU transmission for the STA with STBC, BCC encoding, and a single spatial stream. As shown in the figure, the STA turns on at least the analog and RF circuit 2608 of a single TX chain. To transmit a STBC encoded frame with a single TX chain, the STA combines STBC mapped signal using a combining circuit 2602 after per-space-time-stream inverse Discrete Fourier Transform (IDFT) circuits 2604A and 2604B and GI insertion circuits 2610A and 2610B and before the Windowing circuit 2612. By doing so, the STA can perform the STBC transmission using only a single TX chain beginning at the Windowing circuit 2612, which can save power consumption at the same time by only operating a single TX chain.

Figure 27:
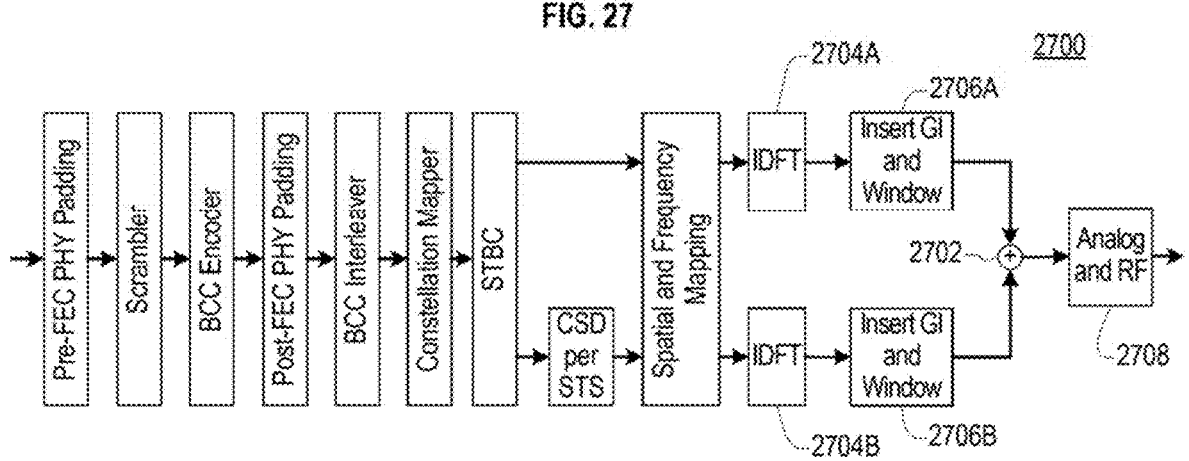
FIG. 27 illustrates a transmitter block for responding to an STBC transmission request using a single transmit chain according to an embodiment.

FIG. 27 illustrates another implementation example for a transmitter block 2700 based on the proposed embodiment. In this example, a STA has two or more transmit chains and indicated to its serving AP that its TX NSS equals to 1, but the AP assigned a trigger based PPDU transmission for the STA with STBC, BCC encoding, and a single spatial stream. As shown in the figure, the STA turns on at least the analog and RF circuit 2708 of a single TX chain. To transmit a STBC encoded frame with a single TX chain, the STA combines STBC mapped signal using a combining circuit 2702 after per-space-time-stream inverse Discrete Fourier Transform (IDFT) circuits 2704A and 2704B and GI and Windowing circuits 2706A and 2706B and before the analog and RF circuit 2708. By doing so, the STA can perform the STBC transmission using only a single analog and RF circuit 2708, which can save power consumption at the same time by only operating a single TX chain.

Similar operation can be done not only for BCC encoding case but also for LDPC encoding case.

Figure 28:
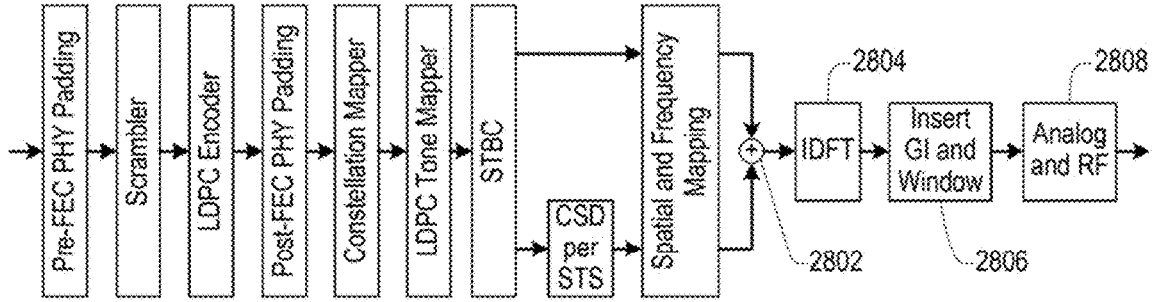
FIG. 28 illustrates a transmitter block for responding to an STBC transmission request using a single transmit chain according to an embodiment.

FIG. 28 illustrates an implementation example for a transmitter block 2800 based on the proposed embodiment. In this example, a STA has two or more transmit chains and indicated to its serving AP that its TX NSS equals to 1, but the AP assigned a trigger based PPDU transmission for the STA with STBC, LDPC encoding, and a single spatial stream. As shown in the figure, the STA turns on at least the analog and RF circuit 2808 of a single TX chain. To transmit a STBC encoded frame with a single TX chain, the STA combines STBC mapped signal using a combining circuit 2802 before inverse Discrete Fourier Transform (IDFT) circuit 2804. By doing so, the STA can perform the STBC transmission using only a single TX chain beginning at the IDFT circuit 2804 and continuing through the GI Insertion and Windowing circuit 2806 and analog and RF circuit 2808, which saves power consumption.

Figure 29:
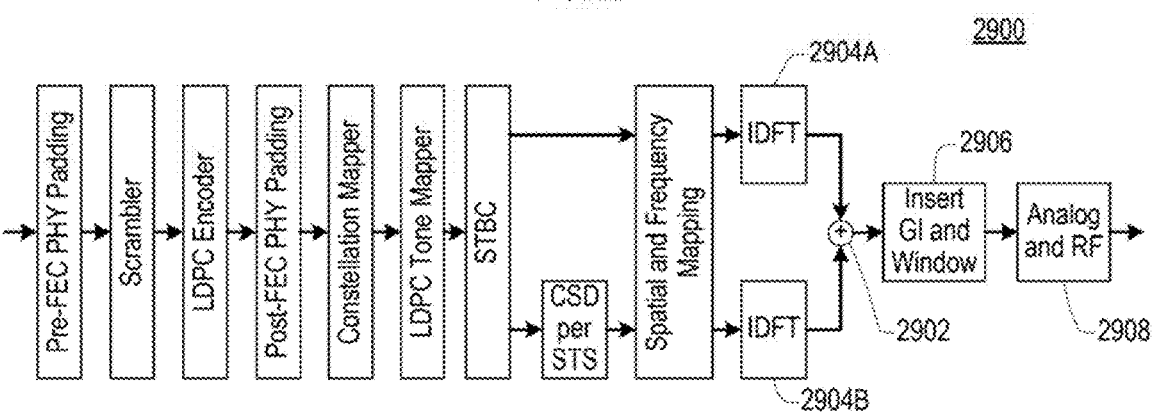
FIG. 29 illustrates a transmitter block for responding to an STBC transmission request using a single transmit chain according to an embodiment.

FIG. 29 illustrates another implementation example for a transmitter block 2900 based on the proposed embodiment. In this example, a STA has two or more transmit chains and indicated to its serving AP that its TX NSS equals to 1, but the AP assigned a trigger based PPDU transmission for the STA with STBC, LDPC encoding, and a single spatial stream. As shown in the figure, the STA turns on at least the analog and RF circuit 2908 of a single TX chain. To transmit a STBC encoded frame with a single TX chain, the STA combines STBC mapped signal using a combining circuit 2902 after the per-space-time-stream inverse Discrete Fourier Transform (IDFT) circuits 2904A and 2904B and before the GI Insertion and Windowing circuit 2906. By doing so, the STA can perform the STBC transmission using only a single TX chain beginning at the GI Insertion and Windowing circuit 2906 and continuing through the analog and RF circuit 2908, which saves power consumption.

Figure 30:
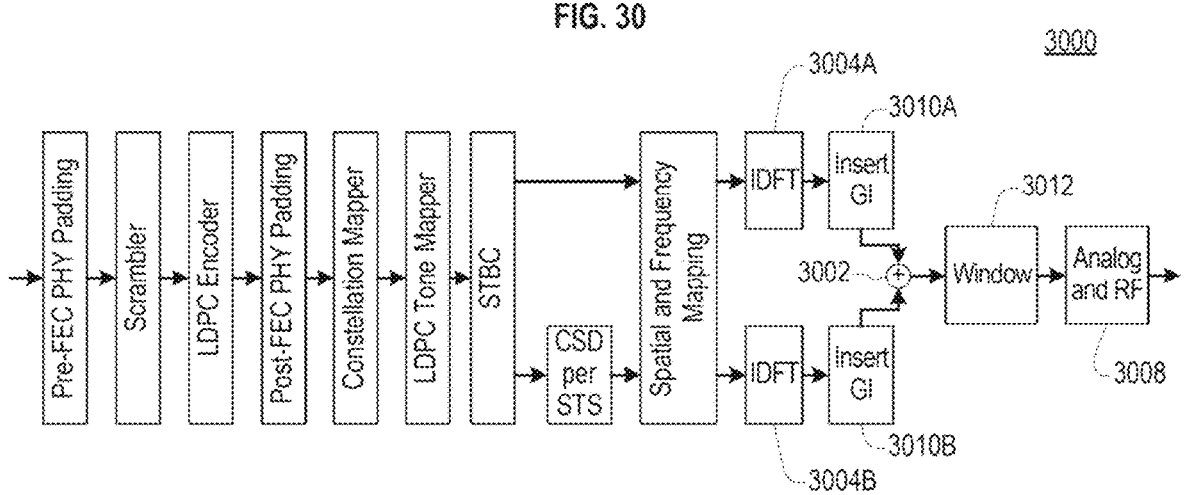
FIG. 30 illustrates a transmitter block for responding to an STBC transmission request using a single transmit chain according to an embodiment.

FIG. 30 illustrates another implementation example for a transmitter block 3000 based on the proposed embodiment. In this example, a STA has two or more transmit chains and indicated to its serving AP that its TX $N_{SS}$ equals to 1, but the AP assigned a trigger based PPDU transmission for the STA with STBC, LDPC encoding, and a single spatial stream. As shown in the figure, the STA turns on at least the analog and RF circuit 3008 of a single TX chain. To transmit a STBC encoded frame with a single TX chain, the STA combines STBC mapped signal using a combining circuit 3002 after per-space-time-stream inverse Discrete Fourier Transform (IDFT) circuits 3004A and 3004B and GI insertion circuits 3010A and 3010B and before the Windowing circuit 3012. By doing so, the STA can perform the STBC transmission using only a single TX chain beginning at the Windowing circuit 3012, which can save power consumption at the same time by only operating a single TX chain.

Figure 31:
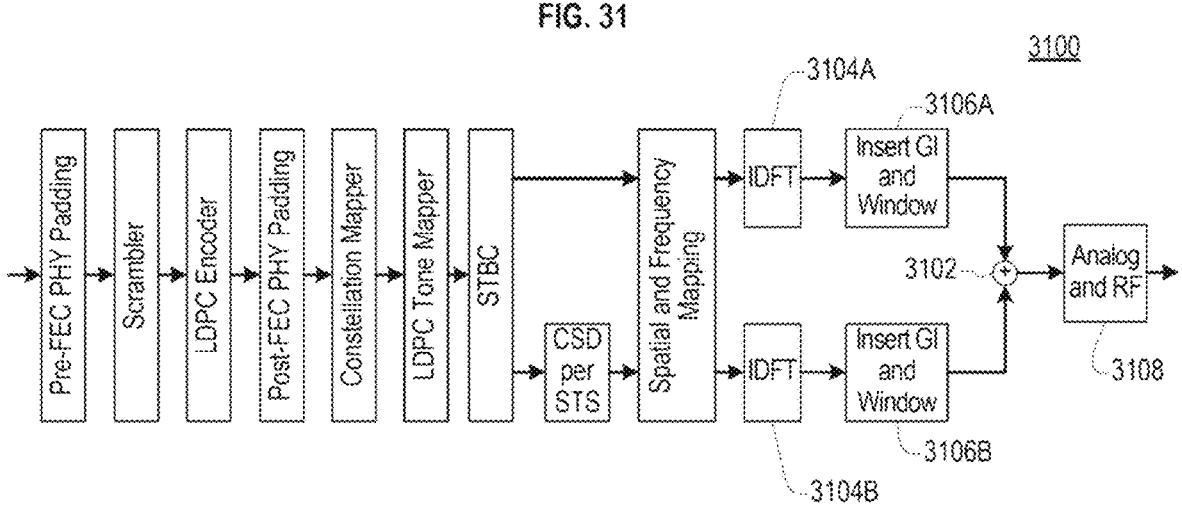
FIG. 31 illustrates a transmitter block for responding to an STBC transmission request using a single transmit chain according to an embodiment.

FIG. 31 illustrates another implementation example for a transmitter block 3100 based on the proposed embodiment. In this example, a STA has two or more transmit chains and indicated to its serving AP that its TX NSS equals to 1, but the AP assigned a trigger based PPDU transmission for the STA with STBC, LDPC encoding, and a single spatial stream. As shown in the figure, the STA turns on at least the analog and RF circuit 3108 of a single TX chain. To transmit a STBC encoded frame with a single TX chain, the STA combines STBC mapped signal using a combining circuit 3102 after per-space-time-stream inverse Discrete Fourier Transform (IDFT) circuits 3104A and 3104B and GI and Windowing circuits 3106A and 3106B and before the analog and RF circuit 3108. By doing so, the STA can perform the STBC transmission using only a single analog and RF circuit 3108, which can save power consumption at the same time by only operating a single TX chain.

In one embodiment, the proposed idea of combining multiple space time streams after STBC encoding can be done at any part in the course of transmit chain.

Figure 32:
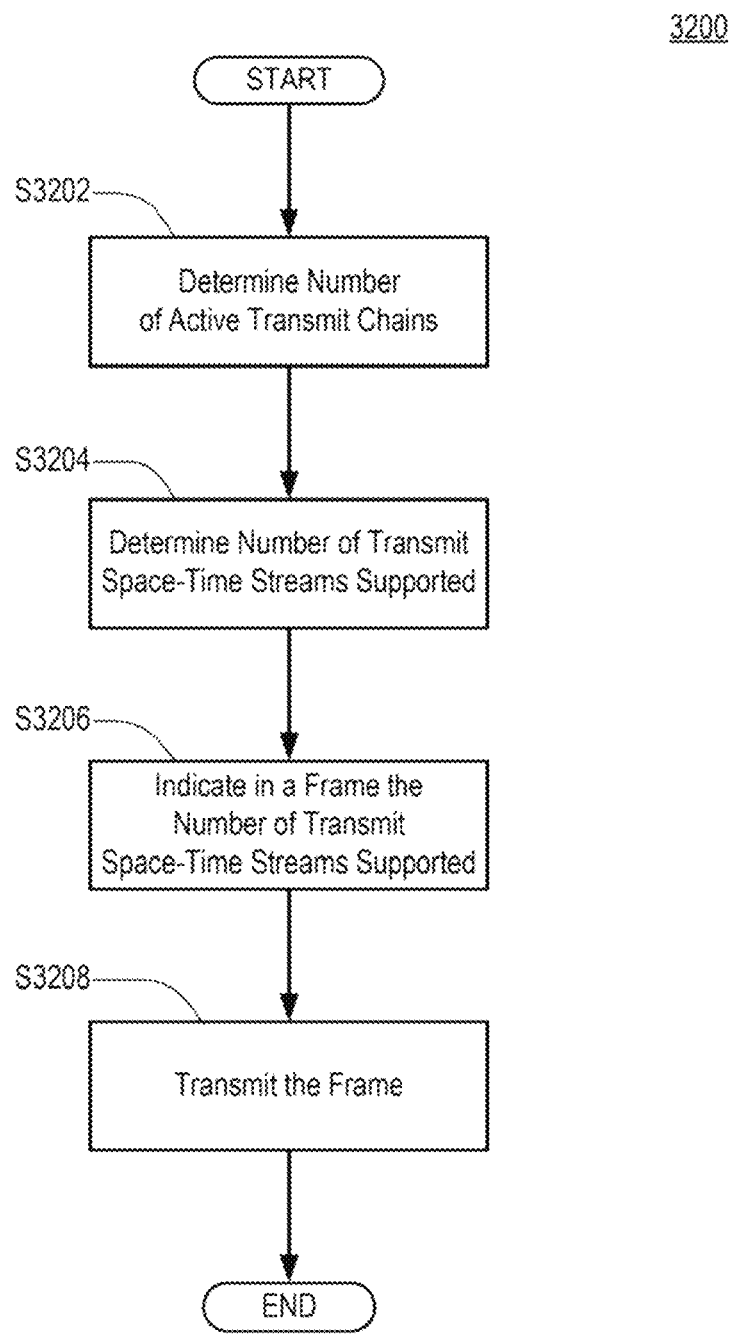
FIG. 32 illustrates a process for communicating a transmission capability according to embodiment.

FIG. 32 illustrates a process 3200 for communicating a transmission capability according to embodiment. The process 3200 may be performed by a wireless device, such as the wireless device 200 of FIG. 2.

At S3202, the wireless device determines a number of active transmit chains out of a plurality of wireless transmit chains in the wireless device. The number of active transmit chains may correspond to a number of active RF transmitter circuits or a number of active antennas. The number of active transmit chains may be a number of active transmit chains available for use in transmitting a frame or a response frame to one or more future Trigger frames.

At S3204, the wireless device determines a number of transmit space-time streams supported by the transmit chains (i.e., a maximum number of space-time streams), the maximum number of space-time streams being determined according to the number of active transmit chains. For example, at most one transmit space-time stream is supported when only one transmit chain is active, two transmit space-time streams may be supported when two transmit chain are active, and so on.

At S3206, the wireless device produces a frame including an indication of the maximum number of space-time streams. The frame may be a Control Wrapper frame, or the frame may be a Quality of Service (QoS) data or management frame. The indication may be included in a High Efficiency (HE) Aggregated Control (A-Control) field of a High Throughput (HT) Control field of the frame. The indication may be included in an Operating Mode field of the HE A-Control field. The indication may have a value corresponding to the maximum number of space-time streams minus 1.

At S3208, the wireless device transmits the frame. The frame may be transmitted to an Access Point (AP) that the wireless device is associated with.

In above explanations and figures, illustrative embodiments were provided to allow a person of skill in the art to understand and implement embodiments of the disclosure. However, embodiments are not limited thereto, and are therefore not limited to the number of STAs, specific identifications, specific formats, specific number of STAs per identifications, or other specifics of the illustrative embodiments. Furthermore, while in the description and related figures the reference has made to one or more IEEE Std 802.11 standards, embodiments are not limited thereto, and a person of skill in the art in light of the teachings and disclosures herein would understand how the present disclosures apply to any wireless operation that operates in licensed or unlicensed bands.

While this invention has been described in connection with what is presently considered to be practical embodiments, embodiments are not limited to the disclosed embodiments, but, on the contrary, may include various modifications and equivalent arrangements included within the spirit and scope of the appended claims. Further, two or more embodiments may be combined.

What is claimed is:

1. A method for communicating a transmission capability of a wireless device, the method comprising:
   determining, by the wireless device, a number of active transmits chains of the wireless device;
   determining, by the wireless device using the determined number of active transmit chains, a maximum number of space-time streams, the maximum number of space-time streams being a maximum number of space-time streams that the wireless device can transmit;
   providing, by the wireless device in a frame, an indication of the maximum number of space-time streams; and
   transmitting, by the wireless device, the frame,
   wherein the wireless device is a non-Access Point station (non-AP STA).

2. The method of claim 1, wherein providing the indication of the maximum number of space-time streams includes providing the indication of the maximum number of space-time streams in an High Efficiency (HE) Aggregated Control (A-Control field) of a High Throughput (HT) Control field of the frame.

3. The method of claim 2, wherein the indication of the maximum number of space-time streams is provided in an Operating Mode field included in the HE A-Control field.

4. The method of claim 1, wherein the frame is a Control Wrapper frame or a Quality of Service (QoS) data or management frame.

5. The method of claim 1, wherein the indication of the maximum number of space-time streams is equal to the maximum number of space-time streams minus one.

6. The method of claim 1, wherein the maximum number of space-time streams is a maximum number of space-time streams useable by the wireless device for transmitting a response to a future Trigger frame received by the wireless device.

7. The method of claim 1, wherein the wireless device comprises a plurality of transmit chains.

8. A wireless device, comprising:
a plurality of transmit chains; and
a processor operable to control the plurality of transmit chains,
wherein the wireless device is a non-Access Point station (non-AP STA), and
wherein the wireless device is to:
   determine a number of active transmits chains of the plurality of transmit chains;
   determine, using the determined number of active transmits chains, a maximum number of space-time streams, the maximum number of space-time streams being a maximum number of space-time streams that the wireless device can transmit;
   provide an indication of the maximum number of space-time streams in a frame; and
   transmit the frame using at least one of the plurality of transmit chains.

9. The wireless device of claim 8, wherein the indication of the maximum number of space-time streams is provided in an High Efficiency (HE) Aggregated Control (A-Control field) of a High Throughput (HT) Control field of the frame.

10. The wireless device of claim 9, wherein the indication of the maximum number of space-time streams is provided in an Operating Mode field included in the HE A-Control field.

11. The wireless device of claim 8, wherein the frame is a Control Wrapper frame or a Quality of Service (QoS) data or management frame.

12. The wireless device of claim 8, wherein the indication of the maximum number of space-time streams is equal to the maximum number of space-time streams minus one.

13. The wireless device of claim 8, wherein the maximum number of space-time streams is a maximum number of space-time streams useable by the wireless device for transmitting a response frame to a future Trigger frame received by the wireless device.

14. The wireless device of claim 10, wherein the indication of the maximum number of space-time streams is provided in bits 6 through 8 of the Operating Mode field.

15. The method of claim 3, wherein the indication of the maximum number of space-time streams is provided in bits 6 through 8 of the Operating Mode field.

16. The wireless device of claim 8, wherein the maximum number of space-time streams is a maximum number of space-time streams that the wireless device can transmit using only the determined number of active transmits chains.

17. The method of claim 1, wherein the maximum number of space-time streams is a maximum number of space-time streams that the wireless device can transmit using only the determined number of active transmits chains.

* * * * *